(12) United States Patent
Patel et al.

(10) Patent No.: US 11,900,966 B2
(45) Date of Patent: Feb. 13, 2024

(54) METHOD AND ELECTRONIC DEVICE FOR PRODUCING VIDEO SUMMARY

(71) Applicant: SAMSUNG ELECTRONICS CO., LTD., Suwon-si (KR)

(72) Inventors: Milankumar Patel, Ahmedabad (IN); Nawnil Kumar Jaiswal, Ranchi (IN); Saurabh Tiwari, Kanpur (IN); Tushar Kant Deo, Pusa (IN); Vijayanand Kumar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 17/707,604

(22) Filed: Mar. 29, 2022

(65) Prior Publication Data

US 2022/0223180 A1    Jul. 14, 2022

Related U.S. Application Data

(63) Continuation of application No. PCT/KR2021/019240, filed on Dec. 16, 2021.

(30) Foreign Application Priority Data

Dec. 17, 2020  (IN) .............................. 202041055060
Sep. 1, 2021   (KR) ......................... 10-2021-0116222

(51) Int. Cl.
  *G11B 27/031*    (2006.01)
  *G06V 20/40*     (2022.01)
(52) U.S. Cl.
  CPC ............ *G11B 27/031* (2013.01); *G06V 20/47* (2022.01); *G06V 20/48* (2022.01)

(58) Field of Classification Search
  CPC ....... G11B 27/031; G06V 20/47; G06V 20/48
  See application file for complete search history.

(56) References Cited

U.S. PATENT DOCUMENTS

| 6,741,250 B1 | 5/2004 | Furlan et al. |
| 2002/0051081 A1 | 5/2002 | Hori et al. |

(Continued)

FOREIGN PATENT DOCUMENTS

| KR | 10-0564893 B1 | 3/2006 |
| KR | 10-2019-0119229 A | 10/2019 |

OTHER PUBLICATIONS

Communication issued by the Indian Patent Office dated Jul. 5, 2022 in Indian Patent Application No. 202041055060.

(Continued)

*Primary Examiner* — Sunghyoun Park
(74) *Attorney, Agent, or Firm* — Sughrue Mion, PLLC

(57) ABSTRACT

A method of providing a video summary by an electronic device. The method includes receiving, by the electronic device, a video including a plurality of frames; determining, by the electronic device, at least one view point of a user viewing the video; determining, by the electronic device, at least one region of interest (ROI) of the user in at least one frame among the plurality of frames based on the at least one view point of the user; identifying, by the electronic device, a frame set from the plurality of frames including the at least one ROI based on determining the at least one ROI in the at least one frame; providing, by the electronic device, the video summary based on the identified frame set; and displaying the video summary on a display of the electronic device.

18 Claims, 36 Drawing Sheets

(56) References Cited

U.S. PATENT DOCUMENTS

| | | |
|---|---|---|
| 2014/0086553 A1 | 3/2014 | Moon et al. |
| 2016/0021333 A1 | 1/2016 | Lim et al. |
| 2016/0080835 A1* | 3/2016 | von Sneidern .... H04N 21/8549 386/282 |
| 2017/0026811 A1 | 1/2017 | Gopalan |
| 2017/0040036 A1 | 2/2017 | Ryu et al. |
| 2018/0132006 A1* | 5/2018 | Galant ................. G11B 27/105 |
| 2018/0330169 A1* | 11/2018 | van Hoof ............... G06V 20/46 |
| 2019/0013047 A1* | 1/2019 | Wait ..................... G11B 27/031 |
| 2019/0182436 A1* | 6/2019 | Gupta ................... H04N 5/272 |
| 2020/0166996 A1 | 5/2020 | Seo et al. |

OTHER PUBLICATIONS

International Search Report (PCT/ISA/210) dated Apr. 13, 2022 issued by the International Searching Authority in International Application No. PCT/KR2021/019240.

* cited by examiner

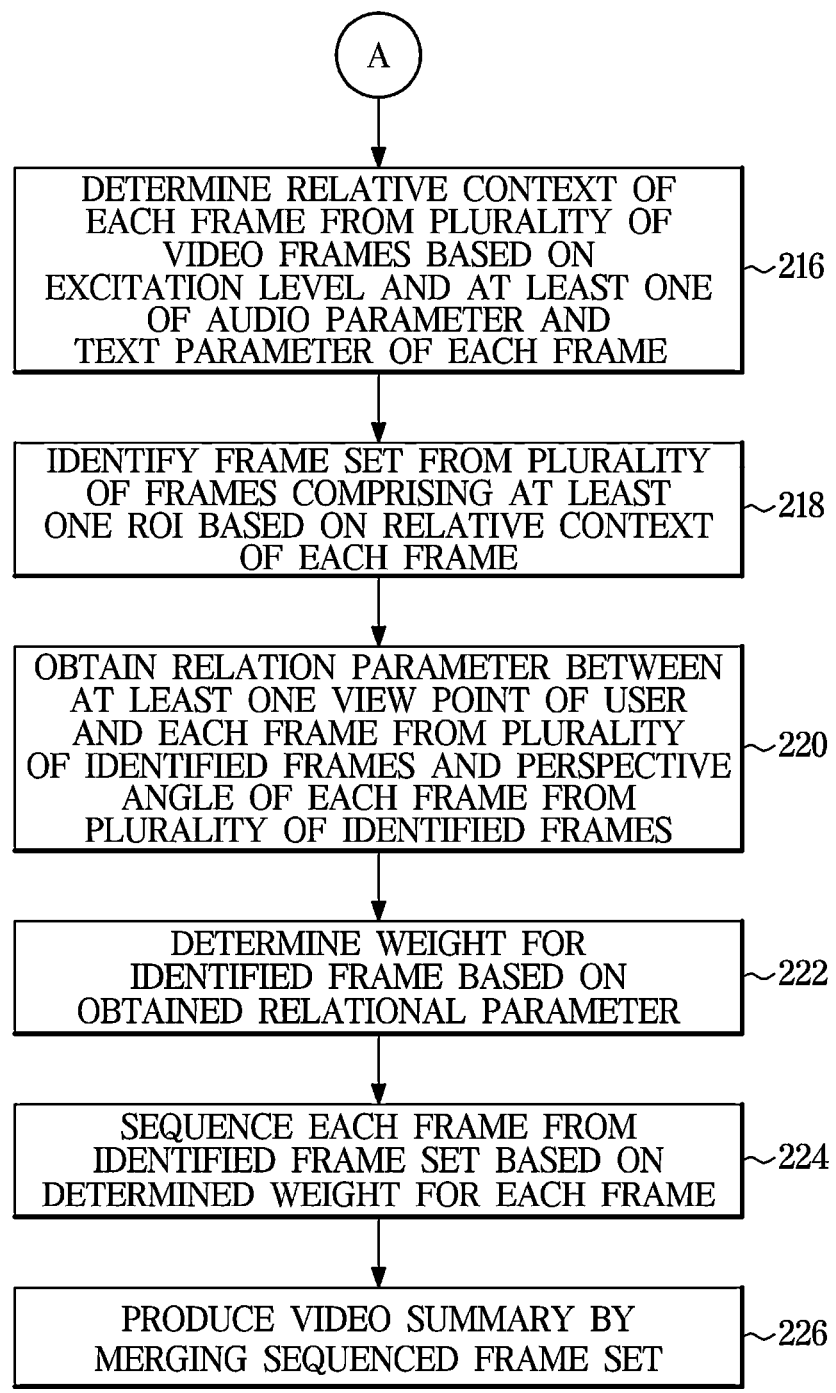

800a

1st Frame set

2nd Frame set

3rd Frame set

4th Frame set

Key frame from the above frame set

1500

Excitation distributtion for selected frames Mean, Variance, Skewness, Kurtosis etc.

1600

Camera angle view points-frames are variable length

Goal & Camera view points　　　　　　　　　　　Goal score changed

METHOD AND ELECTRONIC DEVICE FOR PRODUCING VIDEO SUMMARY

CROSS-REFERENCE TO RELATED APPLICATIONS

This application is a bypass continuation application of International Application No. PCT/KR2021/019240, filed on Dec. 16, 2021, which is based on and claims priority to Indian Patent Application No. 202041055060, filed on Dec. 17, 2020, and Korean Patent Application No. 10-2021-0116222, filed on Sep. 1, 2021, the disclosures of which are incorporated by reference herein in their entireties.

1. Field

The disclosure relates to a video summary producing system, and more particularly, to a method and an electronic device for producing a video summary based on a view point of a user viewing a video.

2. Description of Related Art

In the related art, methods and systems have been proposed for producing a video summary. In the methods and systems of the related art, the video summary is produced based on at least one of a geometrical interpretation for extracting a region of interest for key frame identification, a camera angle for a region of interest, a face color histogram, object information, and intelligent video thumbnail selection and generation. However, these related art methods and systems may have advantages and disadvantages in terms of power consumption, memory usage, robustness, reliability, integrity, operation dependency, time, cost, complexity, design, hardware components used, size, and the like. In addition, it is difficult to capture a view point of a video from a view point of a user, and a neural network may not retain past information to simulate the view point of the user viewing a video. Further, current deep learning systems such as long short-term memory (LSTM)/gated recurrent unit (GRU) are limited in capturing and producing a summary in one video.

Thus, it is desired to address the above-described disadvantages or other shortcomings or at least provide a useful alternative.

SUMMARY

Provided are a method and an electronic device for producing a video summary based on a view point of a user viewing a video.

Also provided is a frame selection technique depending on input excitation per frame or frame sequence. "Input excitation" is a weighting parameter that is compared while selecting a key frame at a view point.

Also provided is a method of determining a change in a view point of a user. Thus, a video summary may be dynamically produced in a cost-effective manner. The view point may be helpful for probabilistic determination for producing multiple video summaries for one video itself.

Also provided is a method of producing a video summary by capturing environmental inputs, user preference, positive or negative ratings or reviews.

In accordance with an aspect of the disclosure, there is provided a method of providing a video summary by an electronic device. The method includes: receiving, by the electronic device, a video including a plurality of frames; determining, by the electronic device, at least one view point of a user viewing the video; determining, by the electronic device, at least one region of interest (ROI) of the user in at least one frame among the plurality of frames based on the at least one view point of the user; identifying, by the electronic device, a frame set from the plurality of frames including the at least one ROI based on determining the at least one ROI in the at least one frame; providing, by the electronic device, the video summary based on the identified frame set; and displaying the video summary on a display of the electronic device.

The at least one view point includes a subjective view point of the user, and the method further includes: obtaining, by the electronic device, a plurality of subjective parameters associated with the user, wherein the plurality of subjective parameters include at least one of an occupation of the user, an age of the user, a preference of the user, an event associated with the user, and an activity of the user on at least one social network site; and determining, by the electronic device, the subjective view point of the user based on the plurality of subjective parameters associated with the user.

The at least one view point includes an objective view point of the user, and the method further includes: obtaining, by the electronic device, a plurality of objective parameters associated with the user, wherein the plurality of objective parameters include at least one of a past history of the user, a present goal of the user, and an additional goal of the user; and determining, by the electronic device, the objective view point of the user based on the plurality of objective parameters associated with the user.

The at least one view point includes a physical view point of the user, and the method further includes: obtaining, by the electronic device, a plurality of physical parameters associated with the user, wherein the plurality of physical parameters include at least one of an angle of a camera associated with the user, a location of the user, an ambient light condition around the user, a weather condition around the user, and a privacy preference of the user; and determining, by the electronic device, the physical view point of the user based on the plurality of physical parameters associated with the user.

The identifying the frame set from the plurality of frames including the at least one ROI includes: determining, by the electronic device, an excitation level of each frame from the plurality of frames of the video based on a plurality of excitation parameters associated with each frame of the plurality of frames, wherein the plurality of excitation parameters include at least one of a speed of the ROI, an intensity of the ROI, an appearance frequency of the ROI, and a duration of playback; extracting, by the electronic device, at least one of an audio parameter and a text parameter from each frame of the plurality of frames; determining, by the electronic device, a relative context of each frame from the plurality of video frames of the video based on the excitation level and at least one of the audio parameter and the text parameter of each frame; and identifying, by the electronic device, the frame set from the plurality of frames including the at least one ROI based on the relative context of each frame.

The providing the video summary based on the identified frame set includes: determining, by the electronic device, a weight for each frame of the plurality of frames from the identified frame set based on the at least one ROI and the view point of the user; sequencing, by the electronic device, each frame from the identified frame set based on the determined weight for each frame; and producing, by the electronic device, the video summary by merging the sequenced frame set.

The determining the weight for each frame from the identified frame set based on the at least one ROI and the view point of the user includes: obtaining, by the electronic device, a relation parameter between the at least one view point of the user and each frame from the plurality of identified frames and a perspective angle of each frame from the plurality of identified frames, wherein the relation parameter includes at least one of an angle of the video based on the at least one view point of the user and a perspective view of a scene in the identified frame; and determining, by the electronic device, the weight for the identified frame based on the obtained relation parameter.

The identifying the frame set from the plurality of frames including the at least one ROI includes: determining, by the electronic device, an absolute completeness score of the video; determining, by the electronic device, absolute frame excitation information of the video based on the absolute completeness score; detecting, by the electronic device, co-reference information of the video based on the absolute frame excitation information; and determining, by the electronic device, a sequence excitation level of the video based on the co-reference information.

The determining the absolute frame excitation information of the video based on the absolute completeness score includes: obtaining, by the electronic device, a speed of the ROI, an intensity of the ROI, an appearance frequency of the ROI, and a duration of playback, in each frame of the plurality of frames; and determining, by the electronic device, the absolute frame excitation information of the video based on the obtained speed of the ROI, the obtained intensity of the ROI, the obtained appearance frequency of the ROI, and the obtained duration of playback.

The determining the absolute completeness score includes: obtaining absolute frame information associated with the video; obtaining a completeness threshold associated with the video; and comparing the obtained absolute frame information associated with the video with the obtained completeness threshold associated with the video.

The absolute frame excitation information includes information for driving relative frame excitation associated with the frame set for sequencing the frame set.

The co-reference information includes information for maintaining the sequence excitation level associated with the frame set, and the determining the co-reference information includes: obtaining at least one scene including audio associated with the frame set and semantic similarities associated with the frame set; and determining the co-reference information based on the at least one scene including the audio associated with the frame set and the semantic similarities associated with the frame set.

The method further includes mapping similarities among frames of the frame set based on the sequence excitation level.

In accordance with an aspect of the disclosure, there is provided an electronic device for providing a video summary, including: a display; and a controller connected to the display and configured to: receive a video including a plurality of frames; determine at least one view point of a user viewing the video; determine at least one region of interest (ROI) of the user in at least one frame among the plurality of frames based on the at least one view point of the user; identify a frame set from the plurality of frames including the at least one ROI based on determining the at least one ROI in the at least one frame; provide the video summary based on the identified frame set; and display the video summary on the display.

The at least one view point includes a subjective view point of the user, and the controller is further configured to: obtain a plurality of subjective parameters associated with the user, wherein the plurality of subjective parameters include at least one of an occupation of the user, an age of the user, a preference of the user, an event associated with the user, and an activity of the user on at least one social network site; and determine a subjective view point of the user based on the plurality of subjective parameters associated with the user.

The at least one view point includes an objective view point of the user, and the controller is further configured to: obtain a plurality of objective parameters associated with the user, wherein the plurality of objective parameters include at least one of a past history of the user, a present goal of the user, and an additional goal of the user; and determine the objective view point of the user based on the plurality of objective parameters associated with the user.

The at least one view point includes a physical view point of the user, and the controller is further configured to: obtain a plurality of physical parameters associated with the user, wherein the plurality of physical parameters include at least one of an angle of a camera associated with the user, a location of the user, an ambient light condition around the user, a weather condition around the user, and a privacy preference of the user; and determine the physical view point of the user based on the plurality of physical parameters associated with the user.

The controller is further configured to: determine an excitation level of each frame from the plurality of frames of the video based on a plurality of excitation parameters associated with each of the frames, wherein the plurality of excitation parameters include at least one of a speed of the ROI, an intensity of the ROI, an appearance frequency of the ROI, and a duration of playback; extract at least one of an audio parameter and a text parameter from each frame of the plurality of frames; determine a relative context of each frame from the plurality of video frames based on the excitation level and at least one of the audio parameter and the text parameter of each frame; and identify the frame set from the plurality of frames including the at least one ROI based on the relative context of each frame.

The controller is further configured to: determine a weight for each frame of the plurality of frames from the identified frame set based on the at least one ROI and the view point of the user; sequence each frame from the identified frame set based on the determined weight for each frame; and produce the video summary by merging the sequenced frame set.

The controller is further configured to: obtain a relation parameter between the at least one view point of the user and each frame from the plurality of identified frames and a perspective angle of each frame from the plurality of identified frames, wherein the relation parameter includes at least one of an angle of the video based on the at least one view point of the user and a perspective view of a scene in the identified frame; and determine the weight for the identified frame based on the obtained relation parameter.

The controller is further configured to: determine an absolute completeness score of the video; determine absolute frame excitation information of the video based on the absolute completeness score; detect co-reference information of the video based on the absolute frame excitation information; and determine a sequence excitation level of the video based on the co-reference information.

The controller is further configured to: obtain a speed of the ROI, an intensity of the ROI, an appearance frequency of the ROI, and a duration of playback, in each of the plurality of frames; and determine the absolute frame excitation information of the video based on the obtained speed of the ROI, the obtained intensity of the ROI, the obtained appearance frequency of the ROI, and the obtained duration of playback.

The controller is further configured to: obtain absolute frame information associated with the video; obtain a completeness threshold associated with the video; and determine the absolute completeness score by comparing the obtained absolute frame information associated with the video with the obtained completeness threshold associated with the video.

The controller is further configured to drive relative frame excitation associated with the frame set for sequencing the frame set based on the absolute frame excitation information.

The controller is further configured to: maintain the sequence excitation level associated with the frame set based on the co-reference information; obtain at least one scene including an audio associated with the frame set and semantic similarities associated with the frame set; and determine the co-reference information based on the at least one scene including the audio associated with the frame set and the semantic similarities associated with the frame set.

The controller is further configured to map similarities among frames of the frame set based on the sequence excitation level.

According to an aspect of the disclosure, it is possible to provide a determination of a change in a view point of a user. Thus, the video summary can be dynamically produced in a cost-effective manner. The view point can be helpful for probabilistic determination for producing multiple video summaries for one video itself.

According to an aspect of the disclosure, it is possible to produce a video summary by capturing environmental inputs, user preference, positive or negative ratings or reviews.

BRIEF DESCRIPTION OF THE DRAWINGS

FIGS. 2A and 2B are flowcharts illustrating a method of producing a video summary according to an embodiment.

DETAILED DESCRIPTION

Figure 1:
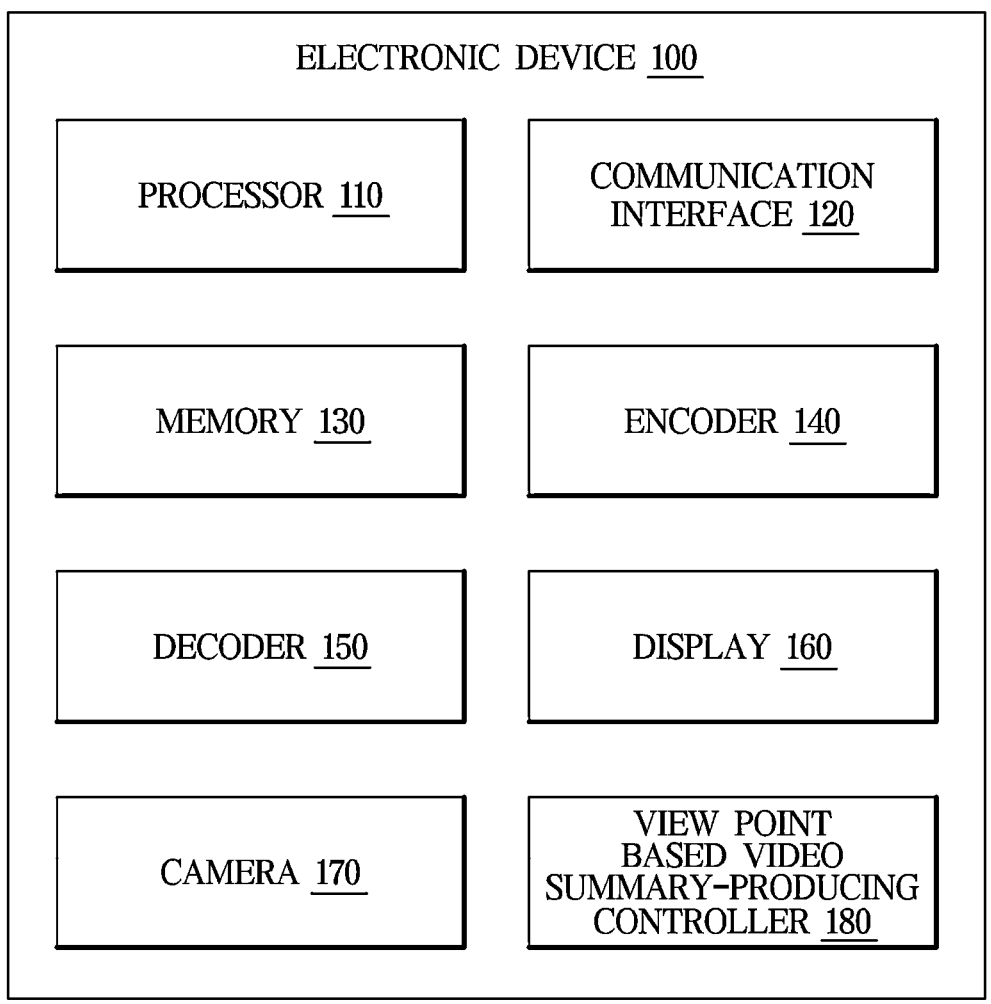
FIG. 1 illustrates various hardware components of an electronic device configured to produce a video summary according to an embodiment.

Embodiments and various features and advantages thereof will be explained in more detail with reference to the accompanying drawings. Descriptions of well-known components and processing techniques are omitted so as to not unnecessarily obscure the embodiments. Also, the embodiments described herein are not mutually exclusive, as some embodiments can be combined with one or more other embodiments to form new embodiments. Herein, the term "or" as used herein, refers to non-exclusive unless otherwise indicated. The examples used herein are intended merely to facilitate an understanding of how the embodiments can be practiced and to enable those of skill in the art to practice the embodiments herein.

The embodiments may be described and illustrated in terms of blocks that carry out a described function or functions. These blocks, which may be referred to as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware. For example, the circuits may be implemented in one or more semiconductor chips, or on one or more substrates that support such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help understand various technical features, and it should be understood that the embodiments are not limited by the accompanying drawings. As such, the present disclosure should be construed to extend to any alterations, equivalents and substitutes in addition to those which are particularly set out in the accompanying drawings. Although the terms "first," "second," and the like may be used herein to describe various components, these components should not be limited by these terms. These terms are generally used to distinguish one element from another.

According to an embodiment, a method of producing a video summary by an electronic device is provided. The method may include receiving, by an electronic device, a video including a plurality of frames. In addition, the method may include determining, by the electronic device, at least one view point of a user viewing the video. The view point may include at least one of a subjective view point of the user, an objective view point of the user, and a physical view point of the user. In addition, the method may include determining, by the electronic device, whether at least one region of interest (ROI) of the user is available in the video based on the at least one view point of the user. In addition, the method may include identifying, by the electronic device, a frame set from a plurality of frames including the at least one ROI in response to determining that the at least one ROI is available in the video. In addition, the method may include producing, by the electronic device, a video summary based on the identified frame set. In addition, the method may include storing, by the electronic device, the video summary.

The method may be used to summarize the video from a view point of the user. The method may be used to determine a change in the view point of the user. Thus, the video summary may be dynamically produced in a cost-effective manner. The method may be used to summarize the video from a view point of the user based on a key frame section. The key frame section may be determined by camera settings, a depth context of objects, a subject context, similar and dissimilar frames, and excitation parameters. In the method, reinforcement learning may be used to capture the view point of the user to produce the video summary. The method may be used to provide the video summary by capturing environmental inputs, thoughts of the user, positive or negative ratings or reviews to understand initial bias.

Related art deep learning systems such as long short-term memory (LSTM)/gated recurrent unit (GRU) are limited in capturing and providing a summary in one video, but the view point may be helpful for probabilistic determination for producing various video summaries for one video itself. The reinforcement learning may be may be based on a deep generative network, and may further extend to the reinforcement learning for dynamically capturing the view point.

In the method, context inputs may reinforce a reinforcement learning model to produce the video summary. The reinforcement learning model may observe the environment by adding a new weight to the frames based on an excitation level. As a result, the video summary may be provided in an efficient manner.

FIG. 1 illustrates various hardware components of an electronic device 100 configured to produce a video summary according to an embodiment. The electronic device 100 may be, for example, a mobile phone, a smartphone, a personal digital assistant (PDA), a tablet computer, a laptop computer, an Internet of things (IoT) device, an immersive system, a virtual reality device, a foldable device, and a flexible device, but is not limited thereto. The electronic device 100 may include a processor 110, a communication interface 120, a memory 130, an encoder 140, a decoder 150, a display 160, a camera 170, and a view point based video summary-producing controller 180. The processor 110 may be connected to the communication interface 120, the memory 130, the encoder 140, the decoder 150, the display 160, the camera 170, and the viewpoint based video summary-producing controller 180.

The camera 170 may capture a video that includes a plurality of frames. The captured video may be transmitted to the view point based video summary-producing controller 180 through the encoder 140 and the decoder 150. The encoder 140 and the decoder 150 may normalize the video in a latent vector space. In a multi-dimensional space, by normalizing parameters such as speed, intensity, frequency, and duration, the view point and the video may be evaluated with the same scale. In order for the reinforcement learning model to understand that normalizing data between 0 and 1 is an example of a parameter or variable, parameters such as min-max scalar may be scaled down.

Further, the view point based video summary-producing controller 180 may receive the video. The view point based video summary-producing controller 180 may be configured to determine a view point of a user viewing the video after receiving the video. The view point may be, for example, a subjective view point of the user, an objective view point of the user, and a physical view point of the user, but is not limited thereto.

Figure 5:
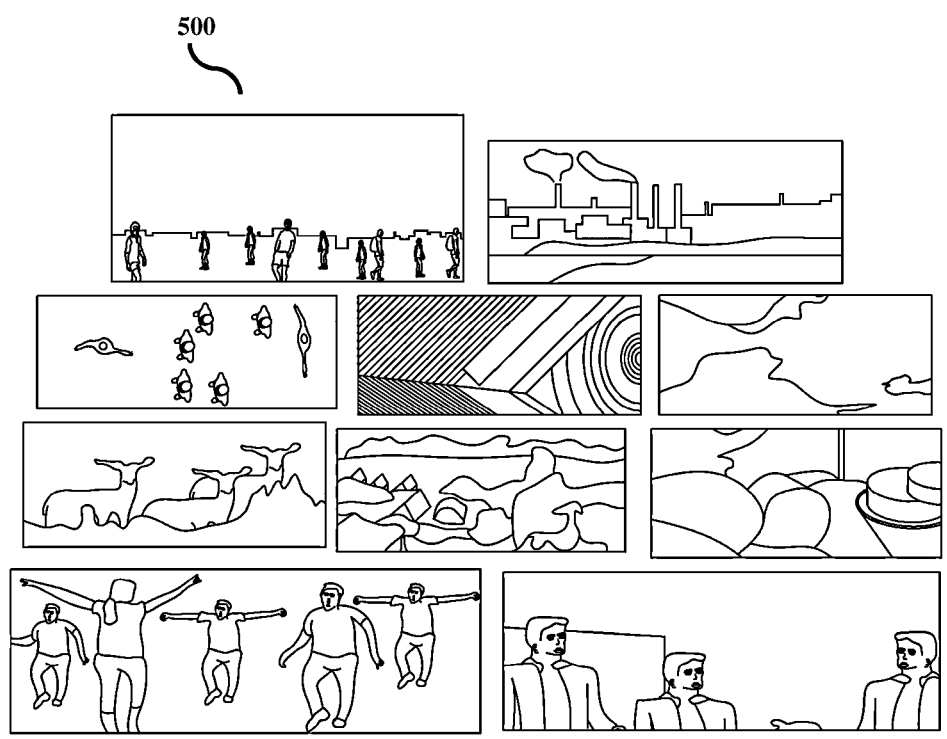
FIG. 5 is a view illustrating an example in which an electronic device produces a video summary based on a subjective view point of a user according to an embodiment.

The subjective view point of the user may be determined by obtaining a plurality of subjective parameters associated with the user, determining a subjective context of the user based on the plurality of subjective parameters associated with the user, and determining the subjective view point of the user based on the subjective context of the user. The plurality of subjective parameters may include, for example, an occupation of the user, an age of the user, a preference of the user, an event associated with the user, and an activity of the user on a social network site, but are not limited thereto. The activity of the user on the social network site may include, for example, clicking "like" on the social network site, clicking "dislike" on the social network site, and sharing photos on the social network site. As an example, the electronic device 100 may produce a video summary based on the subjective view point of the user, as shown in FIG. 5. For example, the user of the electronic device 100 may capture a video of a team meeting, and the user may want to summarize the video based on a CEO speech at the team meeting. Based on an input, the electronic device 100 may produce the video based on the CEO speech at the team meeting. For example, in the event of a train accident, a railroad authority may have a different view point, a police authority may have a different view point, and a medical person may have a different view point, and the video summary may be produced according to such various viewpoints.

Figure 3:
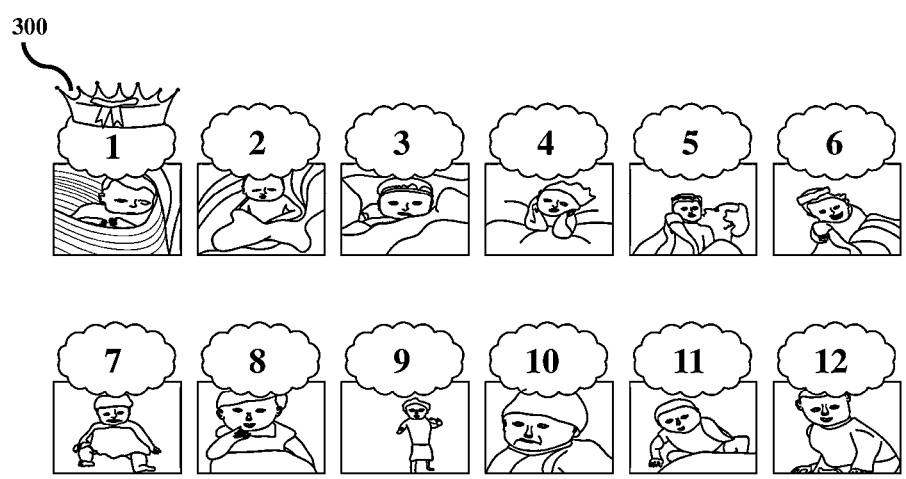
FIG. 3 is a view illustrating an example in which an electronic device produces a video summary based on an objective view point of a user according to an embodiment.

The objective view point of the user may be determined by obtaining a plurality of objective parameters associated with the user, determining an objective context of the user based on the plurality of objective parameters associated with the user, and determining the objective view point based on the objective context of the user. The plurality of objective parameters may include, for example, a past history of the user, a present goal of the user, and an additional goal of the user, but are not limited thereto. The goal of the user may include the aim/motivation of the user. For example, specific criteria (e.g., time frame, objects in images, location, etc.) for summarizing a video may be input through an input interface by a user. The past history of the user may include a past event of the user. As an example, the electronic device 100 may produce a video summary based on an objective view point of the user, as shown in FIG. 3. In FIG. 3, the user of the electronic device 100 may capture a video of a newborn baby and the user of the electronic device 100 may summarize the video of the newborn baby. Based on an input of the user, the user of the electronic device 100 may produce a video of a newborn baby from one month to twelve months.

Figure 4:
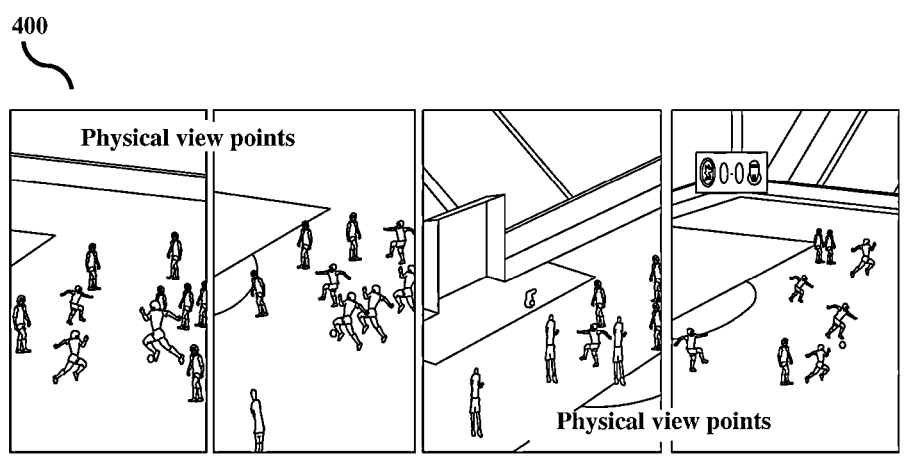
FIG. 4 is a view illustrating an example in which an electronic device produces a video summary based on a physical view point of a user according to an embodiment.

The physical view point of the user may be determined by obtaining a plurality of physical parameters, determining a physical context of the user based on the plurality of physical parameters associated with the user, and determining the physical view point of the user based on the physical context of the user. The plurality of physical parameters may include, for example, an angle of the camera 170, a location of the user, an ambient light condition around the user, a weather condition around the user, and privacy preferences of the user, but are not limited thereto. The electronic device 100 may produce a video summary based on a physical view point of the user in a soccer match, as shown in FIG. 4.

Based on the view point of the user, the view point based video summary-producing controller 180 may be configured to determine a region of interest (ROI) of the user in the video. After determining that the ROI in the video, the view point based video summary-producing controller 180 may be configured to identify a frame set from a plurality of frames including the ROI.

According to an embodiment, the view point based video summary-producing controller 180 may be configured to determine an excitation level of each frame from the plurality of frames of the video based on a plurality of excitation parameters associated with each of the frames. The plurality of excitation parameters may include a speed of the ROI in each frame, an intensity of the ROI in each frame, an appearance frequency in each frame, and a playback duration of each frame, but are not limited thereto. In addition, the view point based video summary-producing controller 180 may be configured to extract an audio parameter and a text parameter of each frame, and determine a relative context of each frame from the plurality of frames of the video based on the excitation level and the audio and video parameters of each frame. In addition, the view point based video summary-producing controller 180 may be configured to identify a frame set from the plurality of frames including the ROI based on the relative context of each frame.

According to an embodiment, in order to identify the frame set from the plurality of frames, the view point based video summary-producing controller 180 may be configured to determine an absolute completeness score of the video, determine absolute frame excitation information of the video based on the absolute completeness score, detect co-reference information of the video based on the absolute frame excitation information, determine a sequence excitation level of the video based on the co-reference information, and identify the frame set from the plurality of frames based on the sequence excitation level of the video. Examples related to the absolute completeness score, the absolute frame excitation information, the co-reference information, and the sequence excitation levels are explained with reference to FIGS. 9 and 10 below.

The absolute frame excitation information of the video may be determined by obtaining a speed of the ROI in each frame, an intensity of the ROI in each frame, an appearance frequency of the ROI in each frame, and a playback duration of each frame, and determining the absolute frame excitation information of the video based on the obtained speed of the ROI in each frame, the obtained intensity of the ROI in each frame, the obtained appearance frequency of the ROI in each frame, and the obtained playback duration of each frame. As an example, while capturing movement in a scene, the speed may include an absolute or relative speed between subjects. As an example, while capturing an engagement of a subject or object, the intensity may include emotion, image heat map, intensity of sound, color heat map, color change, background, and animation. As an example, the frequency may include an appearance of a subject, a repetition, and a similar or dissimilar event of the subject. As an example, the duration may include a frame duration for capturing a sequence.

The absolute completeness score may be determined by obtaining absolute frame information associated with the video, obtaining a completeness threshold associated with the video, and comparing the obtained absolute frame information associated with the video with the obtained completeness threshold associated with the video.

The absolute frame excitation information may be configured to drive relative frame excitation associated with the frame set for sequencing the frame set. The absolute frame excitation information may be captured independently and matched with a segment of reference excitation in the context. The relative frame excitation may be defined as excitation coverage per frame in a sequence. Reference frame excitation may be input, and accordingly, the reference excitation level may be obtained by adjusting the frame sequence.

The co-reference information may include information related to maintaining the sequence excitation level associated with the frame set. The reference information may be determined by obtaining a scene including an audio usage amount associated with the frame set and semantic similarity associated with the frame set, and determining co-reference information based on the obtained scene including the audio usage amount associated with the frame set and the obtained semantic similarity associated with the frame set. The sequence excitation level may be configured to map the similarity associated with the frame set.

The view point based video summary-producing controller 180 may be configured to produce a video summary based on the identified frame set. According to an embodiment, the view point based video summary-producing controller 180 may be configured to determine a weight for each frame from the identified frame set based on the view point and ROI of the user. The weight for each frame from the identified frame set may be determined by obtaining a relation parameter between the view point of the user and each frame from the plurality of identified frames and a perspective angle of each frame from the plurality of identified frames, and determining a weight for the identified frame based on the obtained relation parameter. The relation parameter may identify an angle of the video based on the view point of the user and a perspective view of the scene in the identified frame. In addition, the view point based video summary-producing controller 180 may be configured to sequence each frame from the identified frame set based on the weight determined for each frame and merge the sequenced frame set to produce a video summary.

The view point based video summary-producing controller 180 may be configured to store the video summary in the memory 130. The view point based video summary-producing controller 180 may be configured to display the video summary on the display 160. The display 160 may include, for example, a liquid crystal display (LCD) and a light-emitting diode (LED) display, but is not limited thereto. The display 160 may be implemented with one or more touch sensors for detecting a touch on a screen of the display 160. A mode for providing the video summary may be provided in the display 160. The mode may include, for example, a manual mode, a semi-automatic mode, and a fully automatic mode, but is not limited thereto. Depending on the selected mode, the electronic device 100 may provide a video summary. The manual mode may operate according to an input of the user. The semi-automatic mode may operate based on one or more interests of the user, a search record of the user, a past camera usage amount, and a current ongoing context. The fully automatic mode may operate based on scene analysis and environmental analysis by the electronic device 100.

The view point based video summary-producing controller 180 may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The view point based video summary-producing controller 180 may be implemented in one or more semiconductor chips or on a substrate support such as a printed circuit board or the like. The circuits constituting a block may be implemented by dedicated hardware or by a processor (e.g., one or more programmed microprocessors and associated circuitry), or by a combination of dedicated hardware configured to perform some functions of the block and a processor configured to perform other functions of the block.

In addition, the memory 130 may store instructions to be executed by the processor 110. The memory 130 may include a non-volatile storage element. Examples of such non-volatile storage elements may include magnetic hard disks, optical discs, floppy disks, flash memories, or forms of electrically programmable memories (EPROM) or electrically erasable and programmable (EEPROM) memories. In addition, the memory 130 may be considered a non-transitory storage medium in some examples. The term "non-transitory" may indicate that the storage medium is not embodied in a carrier wave or a propagated signal. However, the term "non-transitory" should not be interpreted that the memory 130 is immovable. In some examples, the memory 130 may be configured to store a larger amount of information. In certain examples, a non-transitory storage medium may store data that may, over time, change (e.g., in a random-access memory (RAM) or a cache).

The processor 110 may be configured to execute instructions stored in the memory 130 and perform various processes. The processor 110 may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), or the like, and/or an artificial intelligence (AI)-dedicated processor such as a neural processing unit (NPU). The processor 110 may include multiple cores and may be configured to execute the instructions stored in the memory 130.

The communication interface 120 may be configured to communicate internally between internal hardware components and with external devices via one or more networks. For example, the communication interface 120 may include a Bluetooth communicator, a wireless fidelity (Wi-Fi) module, and a Li-Fi module, but is not limited thereto.

Figure 6A:
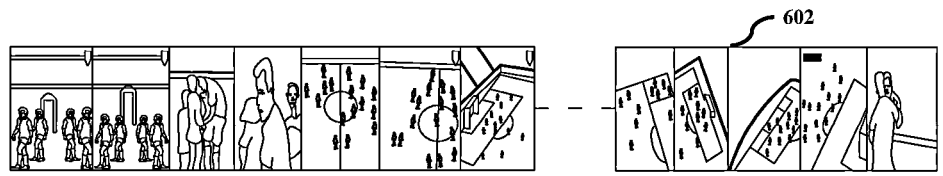
FIGS. 6A to 6C are views illustrating an example of summarizing an entire soccer match at different viewpoints according to an embodiment.
Figure 6B:
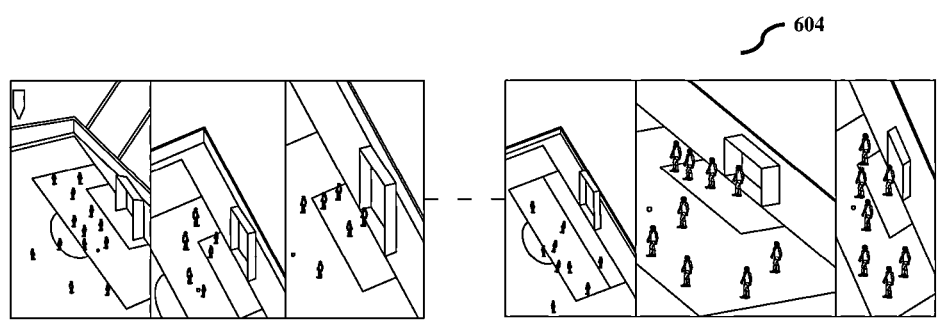
Figure 6C:
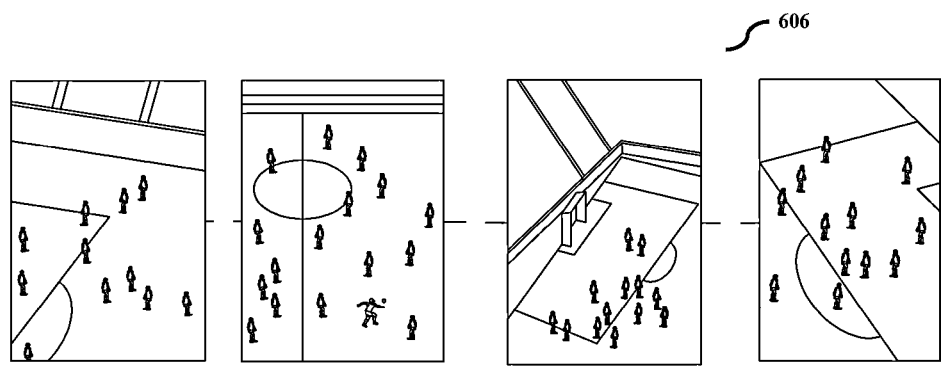
Figure 7A:
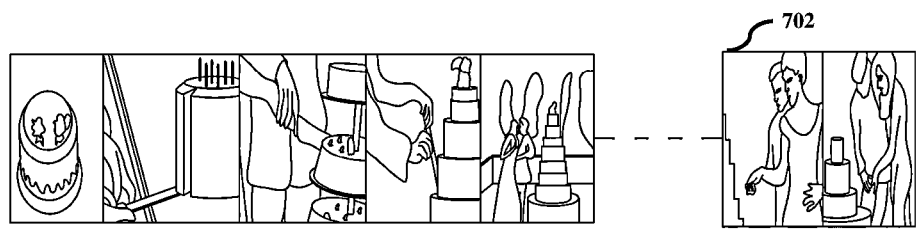
FIGS. 7A to 7C are views illustrating an example of summarizing a cake cutting ceremony from multiple frames of a video according to an embodiment.
Figure 7B:
Figure 7C:
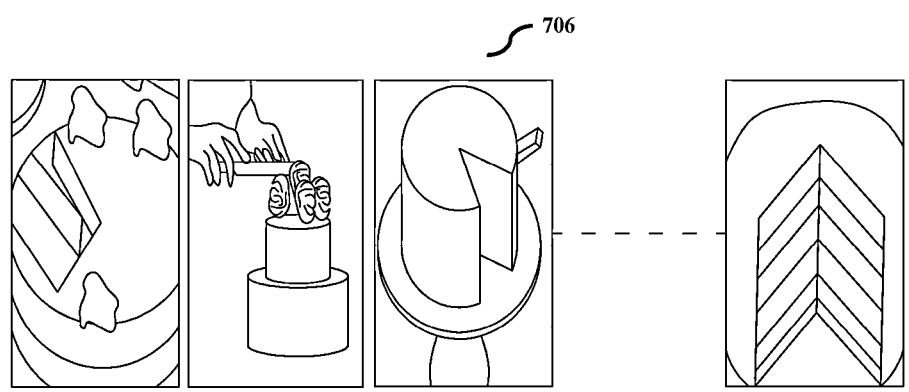

As an example, the electronic device 100 may summarize the entire soccer match at different viewpoints, as shown in FIGS. 6A to 6C. The electronic device 100 may summarize cake cutting ceremony from multiple video frames, as shown in FIGS. 7A to 7C.

FIG. 1 illustrates various hardware components of the electronic device 100, but it should be understood that other embodiments are not limited thereto. According to another embodiment, the electronic device 100 may include a fewer number of components. In addition, a label or name of each of the components is used for illustrative purposes only and does not limit the scope of the present disclosure. One or more components may be combined together to perform the same or substantially similar function to produce a video summary.

Figure 2A:
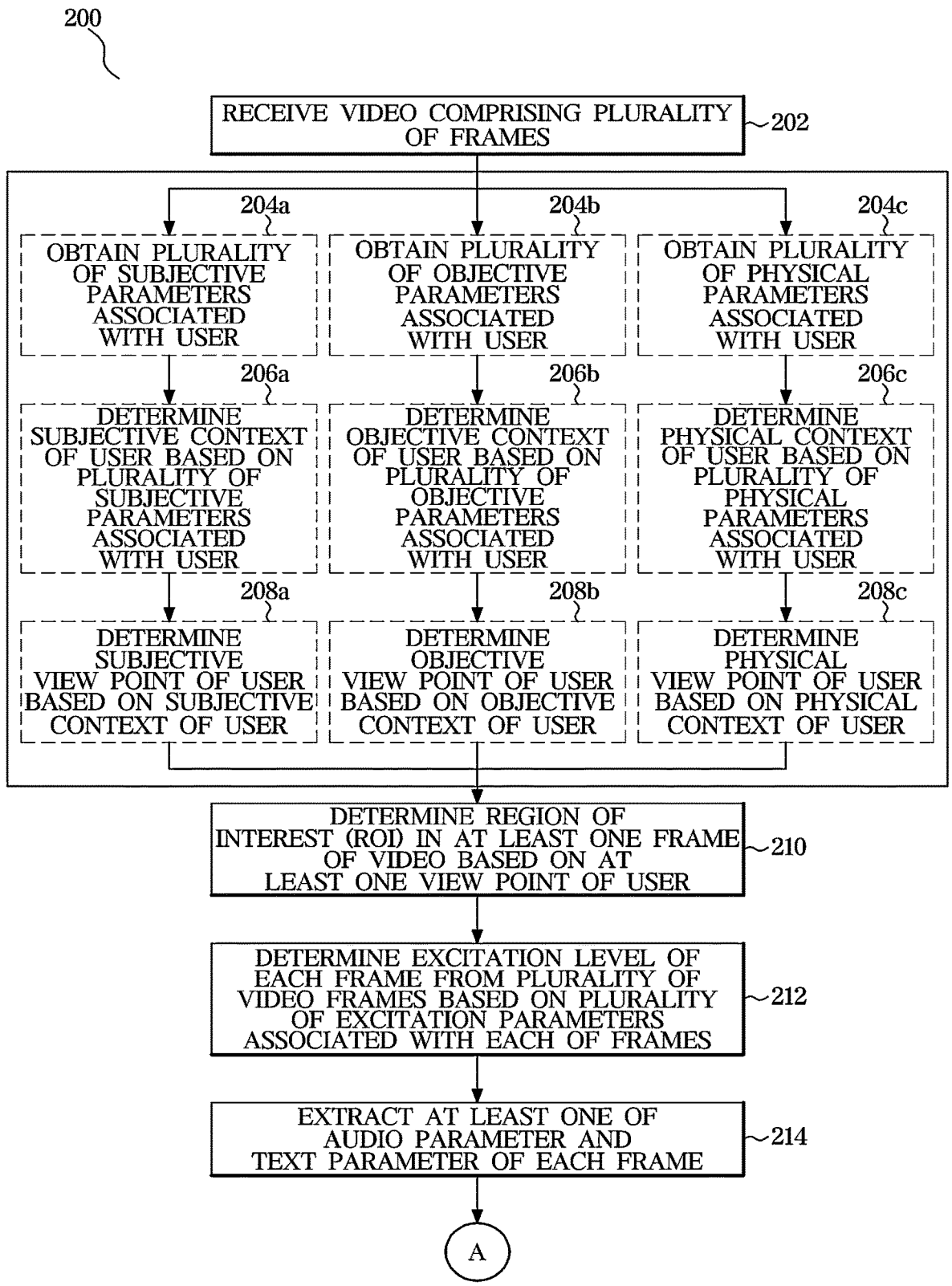

FIGS. 2A and 2B are a flowchart 200 illustrating a method of producing a video summary according to an embodiment. Operations 202 to 226 may be performed by the view point based video summary-producing controller 180.

The method 200 may include receiving a video including a plurality of frames (202). The method may include obtaining a plurality of subjective parameters associated with the user (204*a*). The method may include determining a subjective context of the user based on the plurality of subjective parameters associated with the user (206*a*). The method may include determining a subjective view point of the user based on the subjective context of the user (208*a*).

The method may include obtaining a plurality of objective parameters associated with the user (204*b*). The method may include determining an objective context of the user based on the plurality of objective parameters associated with the user (206*b*). The method may include determining an objective view point of the user based on the objective context of the user (208*b*).

The method may include obtaining a plurality of physical parameters (204c). The method may include determining a physical context of the user based on the plurality of physical parameters associated with the user (206c). The method may include determining a physical view point of the user based on the physical context of the user (208c).

The method may include determining an ROI of the user in the video based on the view point of the user (210). The method may include determining an excitation level of each frame from a plurality of video frames based on a plurality of excitation parameters associated with each frame (212). The method may include extracting an audio parameter and a text parameter of each frame (214). The method may include determining a relative context of each frame from the plurality of video frames based on the excitation level, the audio parameter, and the text parameter of each frame (216).

The method may include identifying a frame set from the plurality of frames including the ROI based on the relative context of each frame (218). The method may include obtaining a relation parameter between the view point of the user and each frame from the plurality of identified frames and a perspective angle of each frame from the plurality of identified frames (220). The method may include determining a weight for the identified frame based on the obtained relation parameter (222). The method may include sequencing each frame from the identified frame set based on the weight determined for each frame (224). The method may include merging the sequenced frame set to produce a video summary (226).

In the method, reinforcement learning may be used to capture the view point of the user to produce the video summary. The method may be used to produce the video summary by capturing environmental inputs, user preference, positive or negative ratings, or reviews.

Conventional deep learning systems such as LSTM/GRU are limited in capturing and producing a summary in one video, but the view point may be helpful for probabilistic determination for producing multiple video summaries for one video itself. The reinforcement learning may be implemented in a deep neural network, and may further extend the reinforcement learning to dynamically capture the view point. However, the one or more embodiments are not limited thereto, and various learning methods can be used in a neural network.

In the method, contextual inputs may reinforce a reinforcement learning model to produce the video summary. The reinforcement learning model may observe the environment and provide a new weight to the frame according to the excitation level. As a result, the video summary may be produced in an effective manner.

The various operations, actions, blocks, steps, and the like of the flowchart 200 may be performed in the order presented, in a different order, or simultaneously. In addition, in some embodiments, some of the operations, actions, blocks, steps, and the like may be omitted, added, modified, or skipped without departing from the scope of the present disclosure.

Figure 8A:
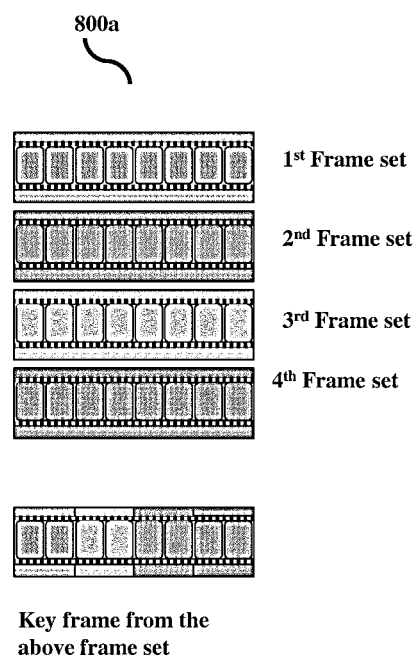
FIG. 8A is a view illustrating a selection of key frames according to an embodiment.
Figure 8B:
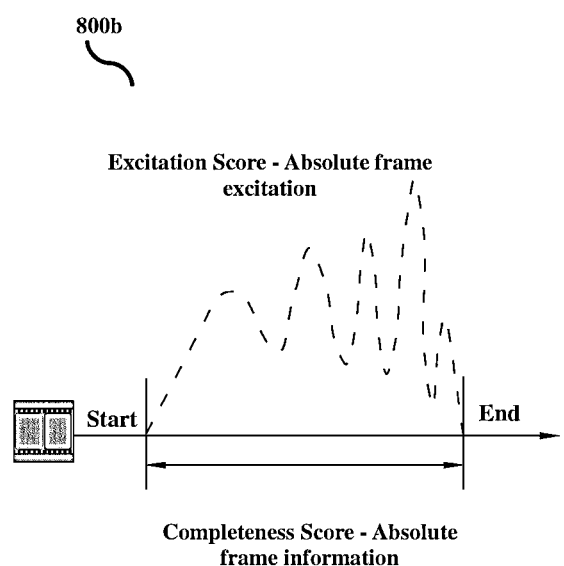
FIG. 8B is a graph illustrating an example in which an excitation score and a completeness score are calculated based on the key frames selected in FIG. 8A according to an embodiment.

FIG. 8A is a view 800a illustrating a selection of key frames according to an embodiment. As an example, four frame sets are available in the video, and the electronic device 100 may identify the view point of the video. Key frames for video producing may be selected based on the view point. A graph 800b of FIG. 8B represents the key frames in which the excitation score and the completeness score are selected. Referring to FIG. 8B, an absolute frame score may be calculated as a weighted average in consideration of speed, frequency, intensity, and duration. The completeness score may be a distribution parameter, such as an average or variance. The completeness score of one frame may be compared with a completeness score of a next frame subsequent to the one frame to be suitable for the next sequence. The completeness score may indicate how many variations may be included in the view point or quality of video frame completeness, but may also indicate whether some portions are cut to match view point excitation. The frame completeness may represent how much meaning is maintained in resulting frames when one frame should delegate the information to the next frame to align the frames.

The key frames may be selected based on excitation evaluation for the absolute frame and relative evaluation for the provided context.

Excitation evaluation for absolute frame may be determined using, for example, four parameters based on the video. The parameters may include speed, intensity, frequency, and duration. The weight may be adjusted to modify the excitation parameters to adjust a request threshold according to the context, or to obtain completeness in qualitative information of the frame. This may support pre-adjustment or post-adjustment for the frame according to selection criteria, context matching, or a threshold.

Relative evaluation for provided context (text or audio) may be determined by evaluating the excitation parameter for a video frame, mapping audio and text parameters on a latent space with the video frame. The relative evaluation will help to understand the relative context of the generalization. Frame selection based on the context may be further derived. In addition, the electronic device 100 may change a color of the frame, a background of the frame, a foreground of the frame to reach or meet an expected excitation level, remove an object from the frame, and replace the object in the frame.

Figure 9:
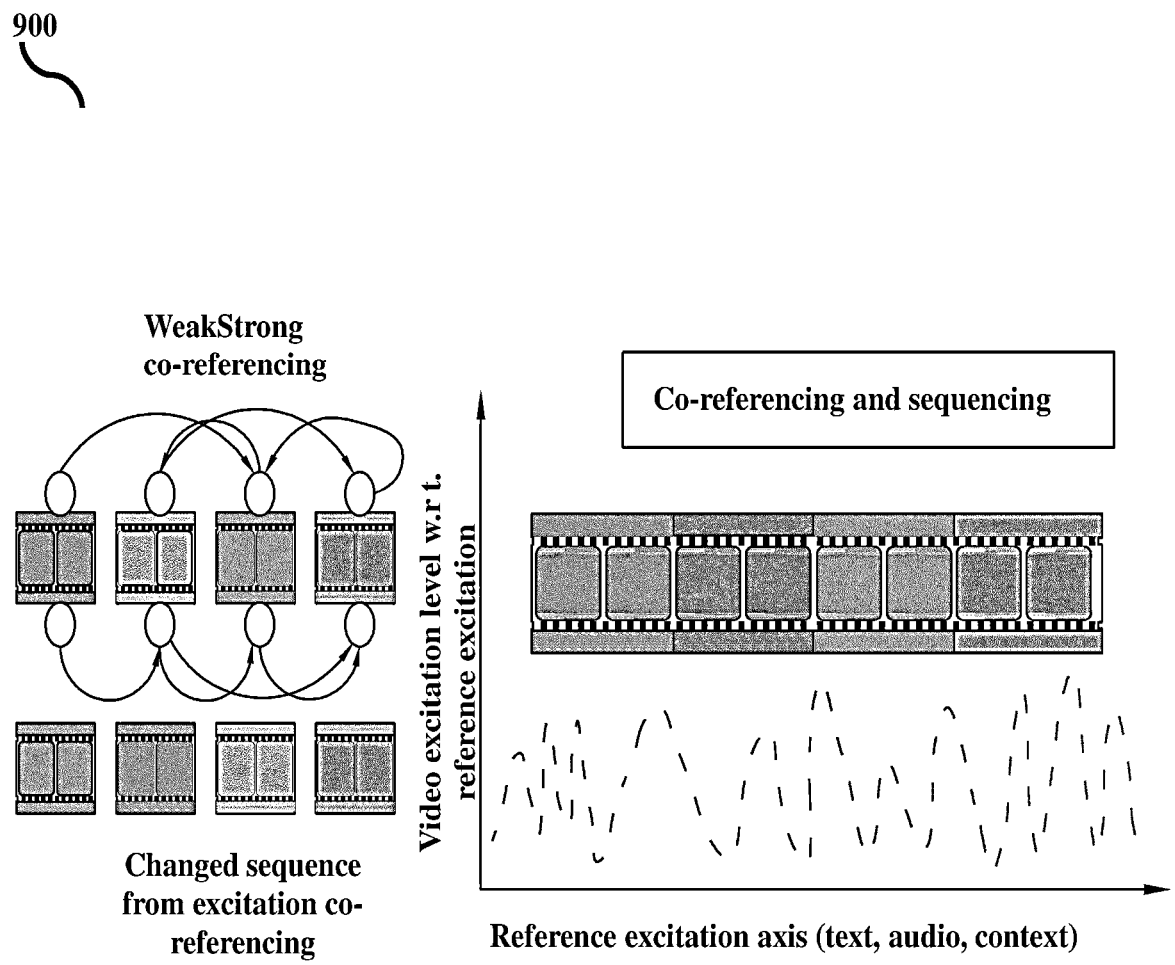
FIG. 9 is a view illustrating frame sequencing according to an embodiment.

FIG. 9 is a view 900 illustrating frame sequencing according to an embodiment. In FIG. 9, weak co-referencing frames and strong co-referencing frames are identified, and a sequence of the frames may be modified from an excitation co-reference for text, audio, and context.

Figure 10:
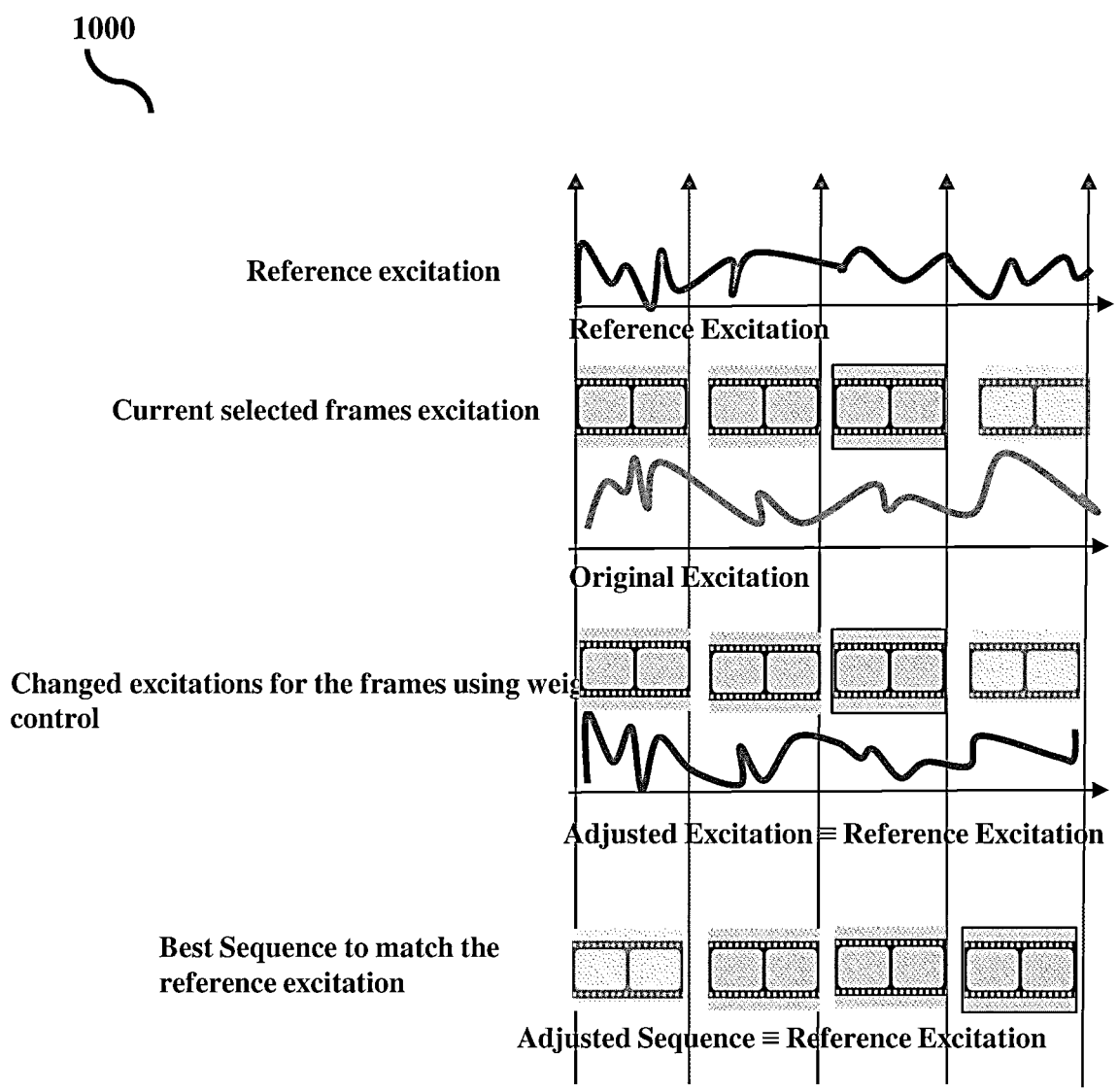
FIG. 10 is a view illustrating adjusted frame sequencing based on a reference excitation frame according to an embodiment.

FIG. 10 is a view 1000 illustrating adjusted frame sequencing based on a reference excitation frame according to an embodiment. The adjusted frame sequence may be determined by receiving reference excitation and current selected frame excitation. The excitation may be changed for the frame by using a weight. Depending on the change of the excitation, the adjusted frame sequence may be generated. The frame for a specific or variable length may generate (a) an overall excitation level that matches the reference excitation or (b) a window wise excitation level. In the excitation matching, (a) weight control may be used to adjust frame properties (e.g., speed, intensity, frequency, or duration), (b) the sequence may be changed when there is a frame that matches the selected sequence, and (c) the frame may be replaced with a new frame during the selection process.

Figure 11:
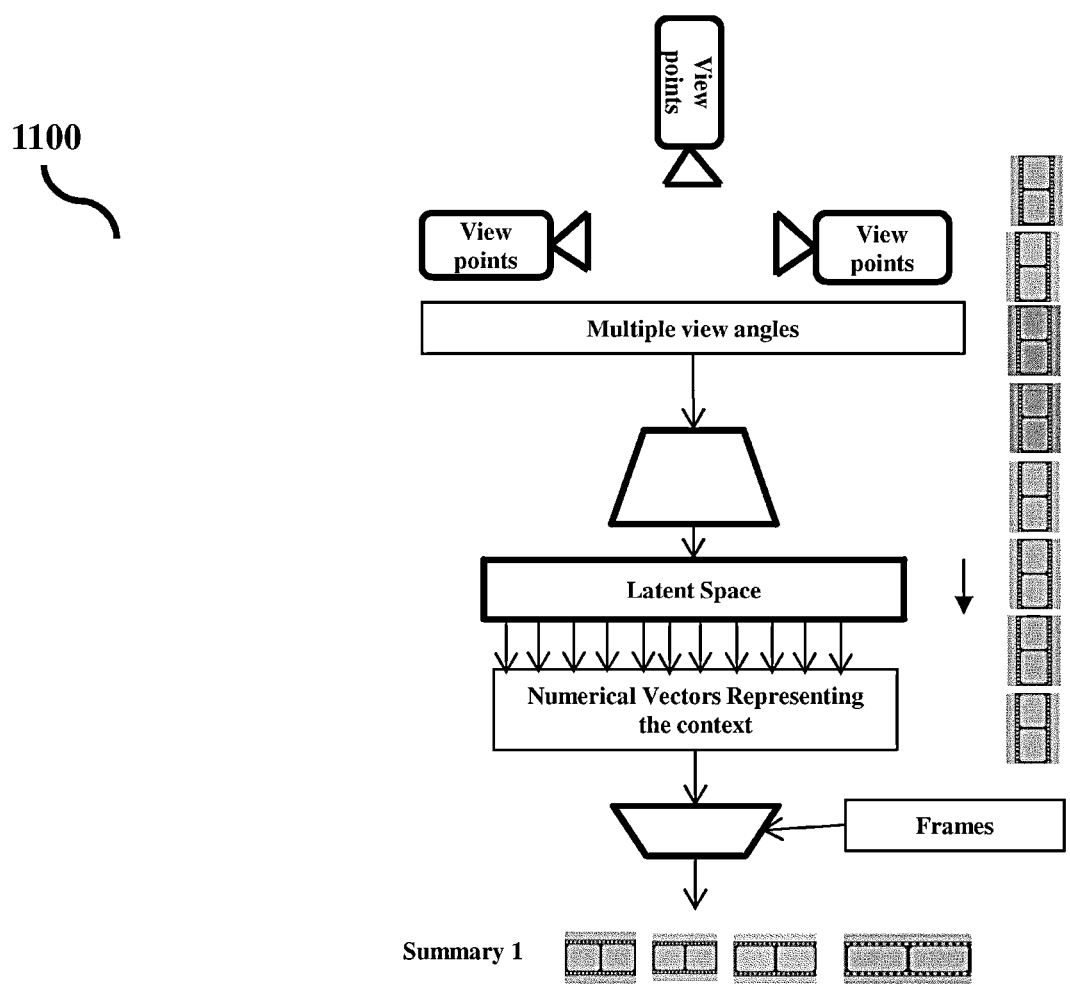
FIG. 11 is a view illustrating an example in which a video summary is produced based on multiple viewpoints according to an embodiment.
Figure 12:
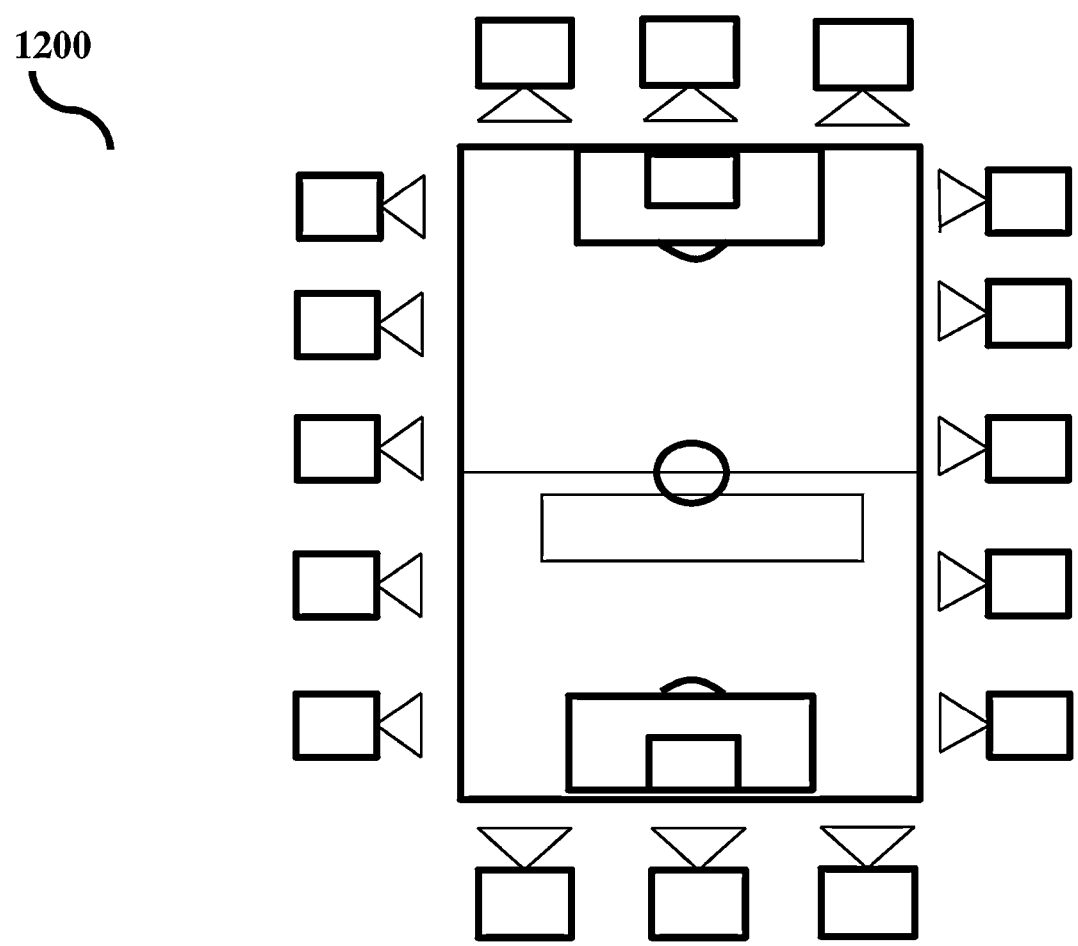
FIG. 12 is a view illustrating an example in which a soccer match summary is produced based on multiple viewpoints according to an embodiment.

FIGS. 11 and 12 are views 1100 and 1200 illustrating examples in which a video summary is produced based on multiple viewpoints according to an embodiment.

As an example, the user of the electronic device 100, who captures user excitation during a movie show using sensor data, may be accepted as an input to produce a video summary for similar (action 1 and action 2) or dissimilar (action and romantic) genres of movies. A video summary may be produced based on movies of similar genres, and another video summary may be produced based on movies of dissimilar genres.

As an example, two users of the electronic device 100 may have different perspectives for rating a movie (e.g., one user may rate based on a fight scene in the movie and another user may rate based on a comedy scene in the movie). Based on the different perspectives, two different video summaries may be produced.

The view point context may be captured in a vector form in the latent space, for example, in a sequence distribution such as in the form of an average, variance, or the like, or an overall distribution. A vector of the latent space may be considered as a reference excitation parameter for the context. When the context is changed, multiple videos may be produced. A slight change in the context may produce multiple videos. In another example, a soccer match summary may be produced based on multiple view points as shown in FIG. 12. The view point in a soccer match may include, for example, a goal post based view point, a player based view point, a manager based view point, a midfielder based view point, a defender based view point, a striker based view point, a penalty based view point, and a jersey number based view point, but is not limited thereto.

Figure 13:
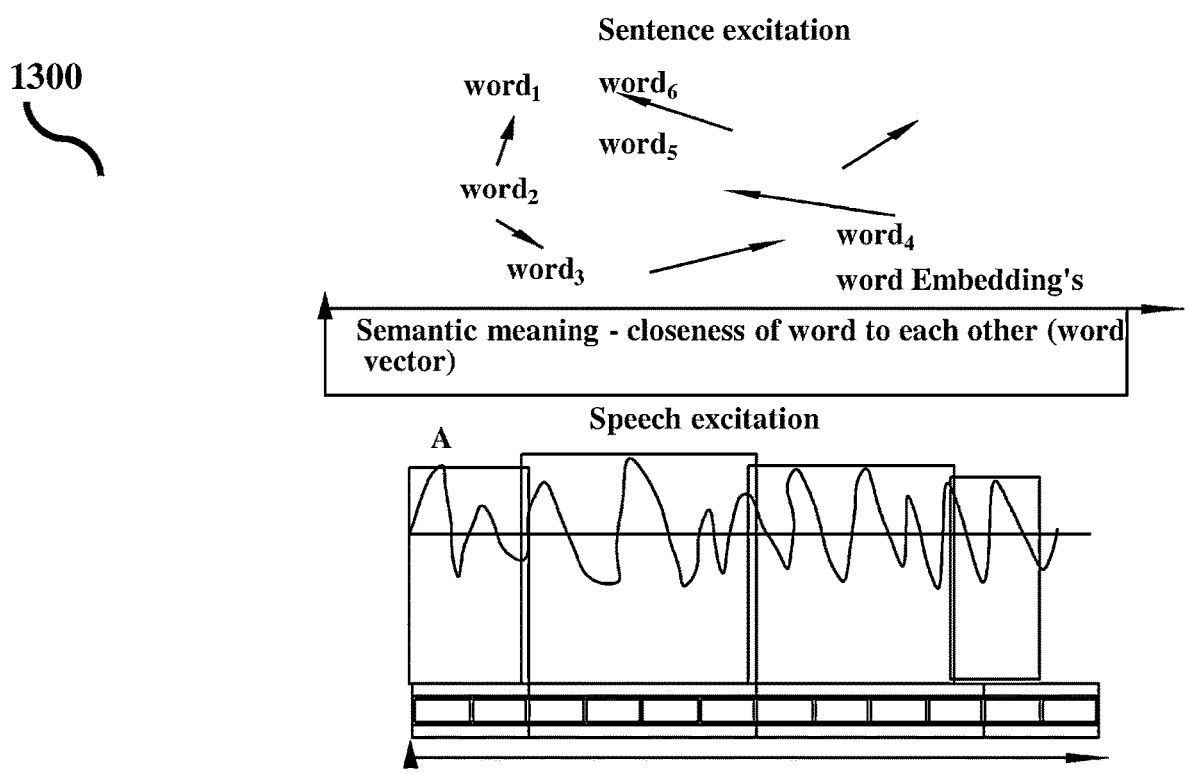
FIG. 13 is a view illustrating video frame excitation based on text and audio according to an embodiment.

FIG. 13 is a view 1300 illustrating video frame excitation based on text and audio according to an embodiment. The video frame excitation may be determined by speech excitation. The speech excitation may be determined by identifying words in a word vector that are close to each other. The speech excitation may be determined by identifying a sentence structure, a part of speech usage of the sentence structure, semantic similarities of the sentence structure, and cross-reference dependencies of the sentence structure. Similarly, the audio excitation may be determined by identifying acoustic properties (e.g., speed, frequency, or the like) of audio and music inputs.

Figure 14:
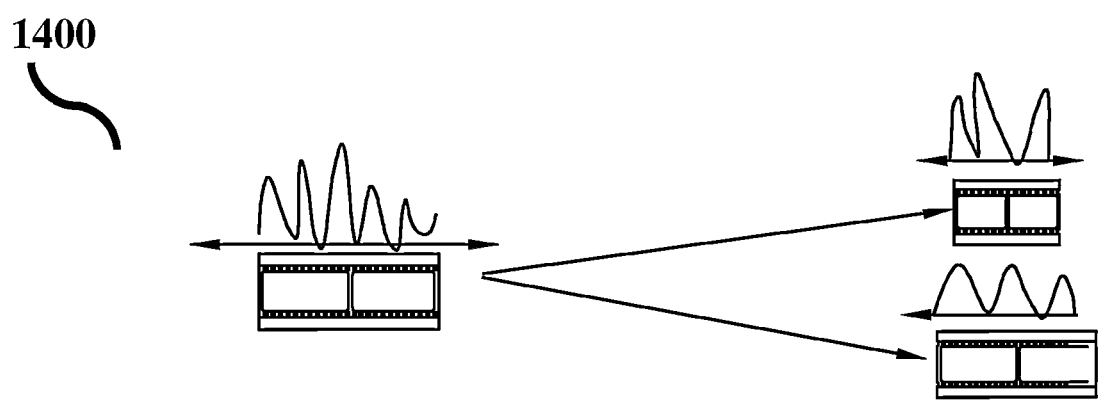
FIGS. 14 and 15 are views illustrating absolute completeness of information in video frames according to an embodiment.
Figure 15:
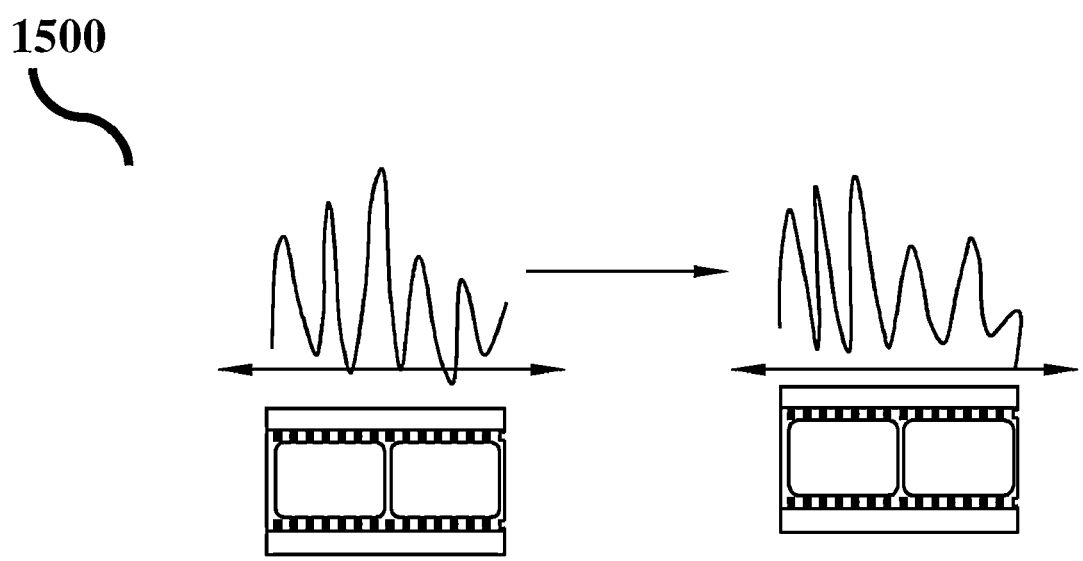

FIGS. 14 and 15 are views 1400 and 1500 illustrating absolute completeness of information in video frames according to an embodiment.

The electronic device 100 may be used to determine a completeness of video frames using an absolute excitation threshold and a weight. The absolute excitation threshold is used for completeness according to an excitation threshold and may fill the frame sequence with matching excitation. The weight is a dynamic weight adjustment to meet absolute video frame excitation. Equation 1 below may be used for determining absolute excitation.

$$\text{Absolute excitation} = w1*\text{speed} + w2*\text{intensity} + w3*\text{frequency} + w4*\text{duration} \quad (1)$$

Here, w1, w2, w3 and w4 are weight adjustments for the absolute excitation threshold.

Figure 16A:
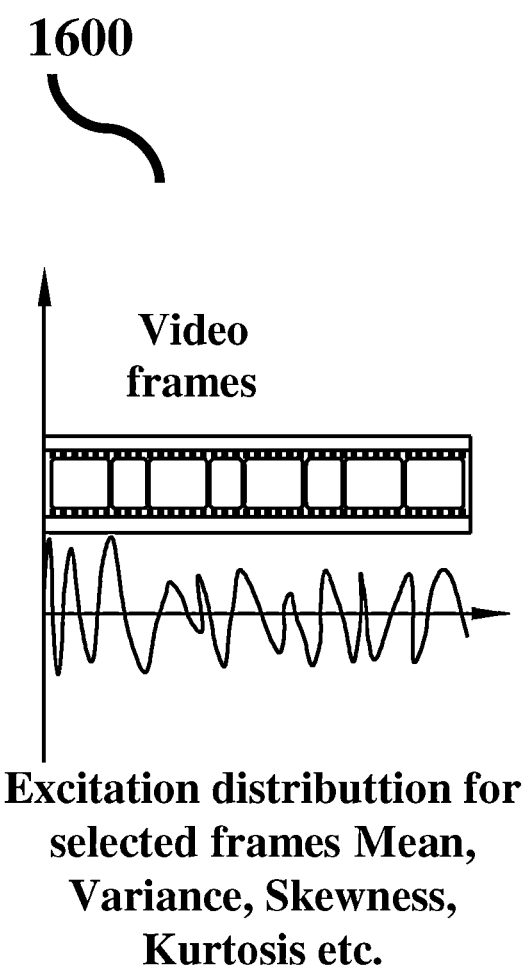
FIG. 16A is a view illustrating video frame excitation according to an embodiment.

FIG. 16A is a view 1600a illustrating video frame excitation according to an embodiment. The video frame excitation may be used to match visual excitation for the video frame.

Figure 16B:
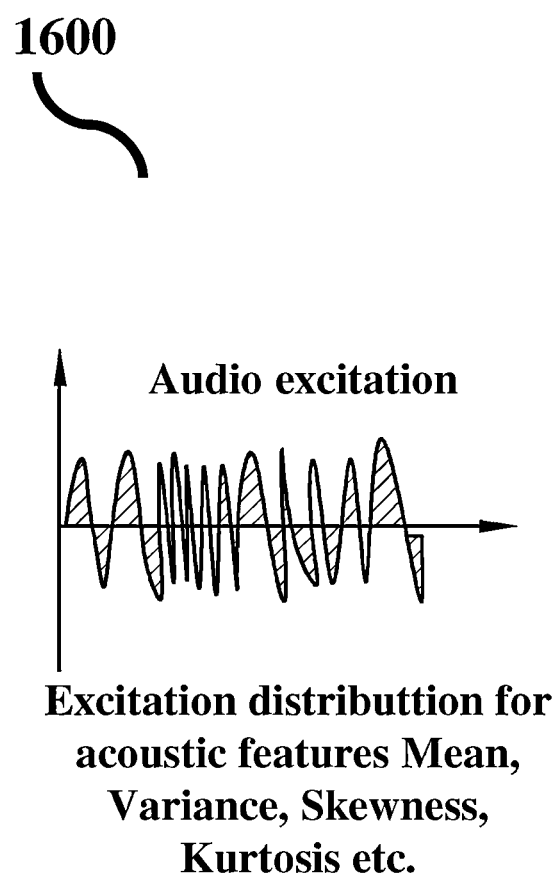
FIG. 16B is a graph illustrating audio frame excitation according to an embodiment.

FIG. 16B is a view 1600b illustrating audio frame excitation according to an embodiment. In the audio excitation, similar excitation matching may be obtained for the audio of a video frame context to support the frame sequence. Acoustic properties such as weights for entire excitations may be used by combining acoustic parameters such as speed, rhythm, pitch, beat, and time period.

Figure 16C:
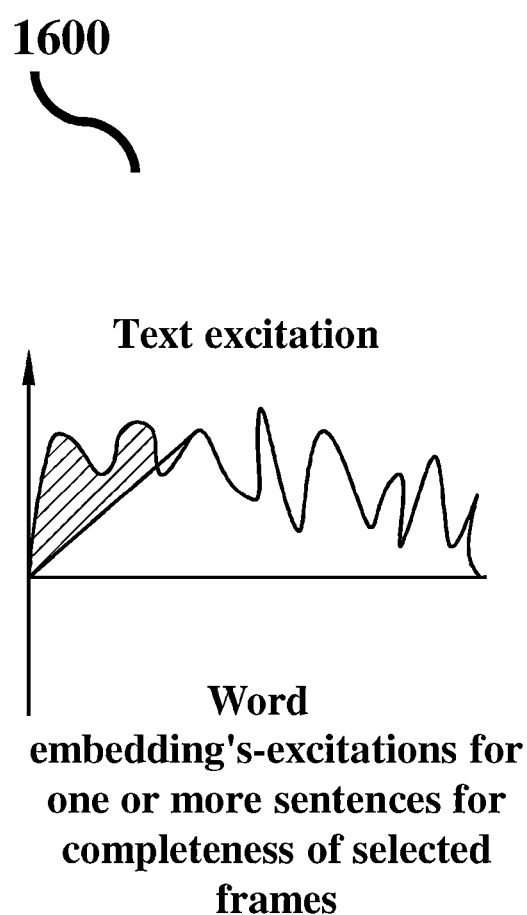
FIG. 16C is a view illustrating text frame excitation according to an embodiment.

FIG. 16C is a view 1600c illustrating text frame excitation according to an embodiment. In text excitation, matching media excitation properties may be calculated, such as a speed at which text can be pronounced, word intensity, frequency of a part of speech, a duration for pronouncing text sentences, and a similarity weight for dynamic adjustment.

Figure 17:
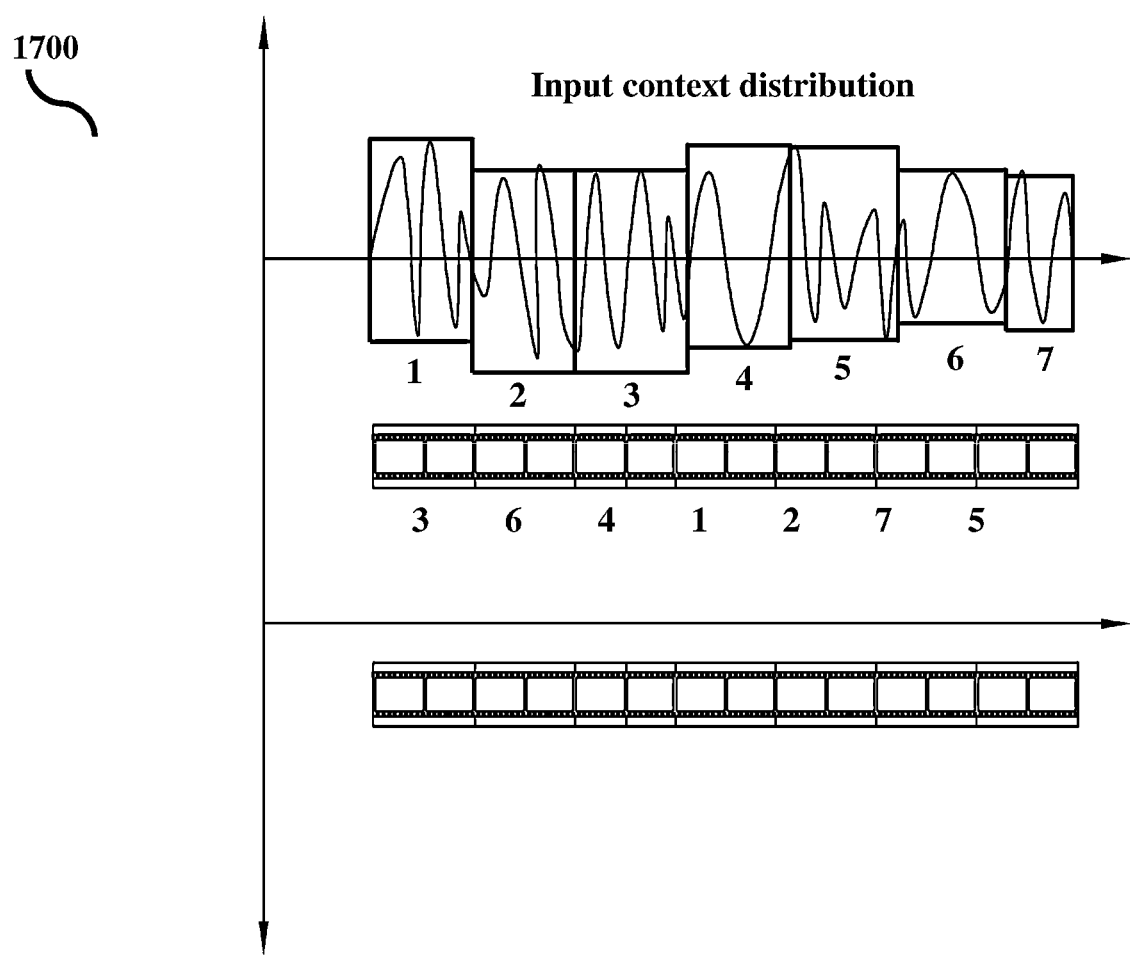
FIG. 17 is a view illustrating sequencing video frames using an input context distribution based on excitation matching in frames, according to an embodiment.

FIG. 17 is a view 1700 illustrating sequencing video frames using an input context distribution based on excitation matching in frames, according to an embodiment. The electronic device 100 may sequentially reselect frames for excitation matching and adjust a weight parameter for arranging the frames in sequence. Specifically, the electronic device 100 may change a weight at different frame locations for completeness and sequencing of the video.

Figure 18:
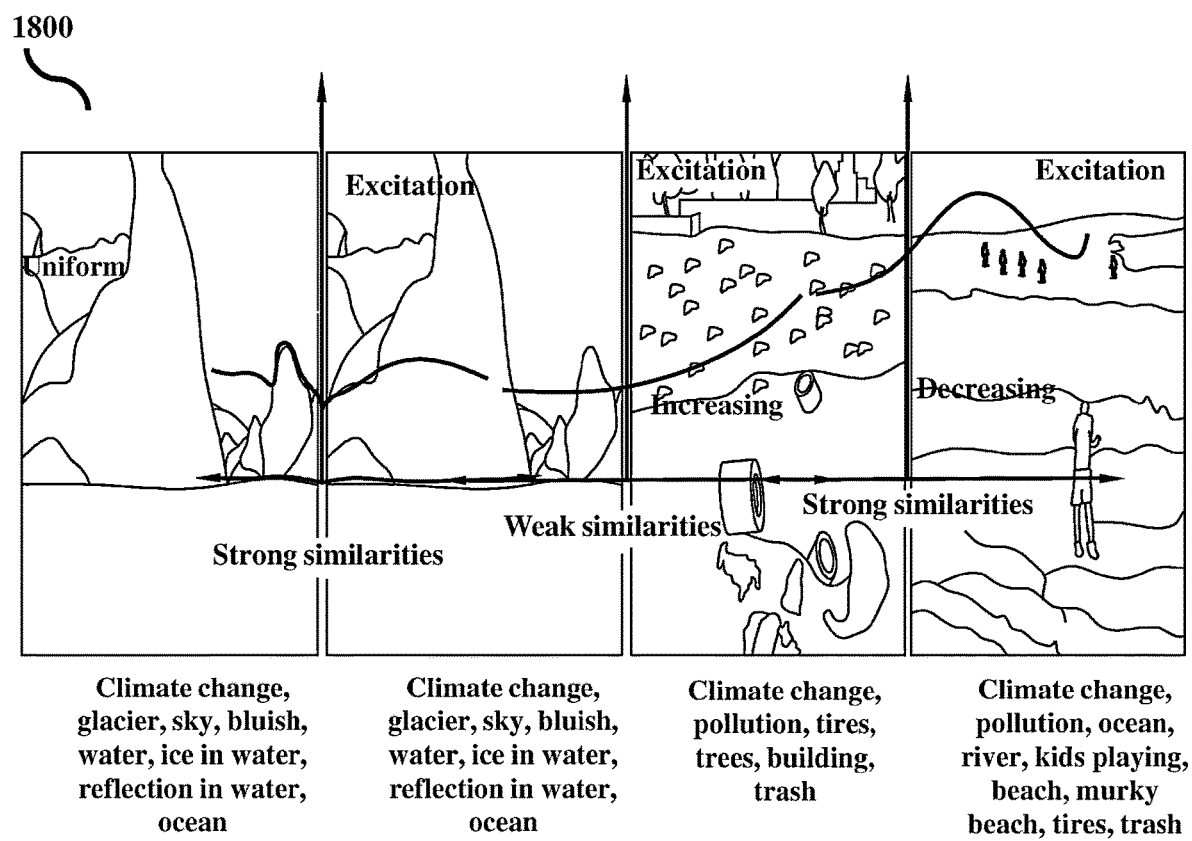
FIG. 18 is a view illustrating sequencing video frames based on excitation matching in the frames of FIG. 17, according to an embodiment.

FIG. 18 is a view 1800 illustrating sequencing video frames based on excitation matching in the frames with reference to FIG. 17, according to an embodiment. In FIG. 18, strong similarity and weak similarity may be identified, and the electronic device 100 may determine that the frames are co-referenced according to the excitation sequence.

Figure 19:
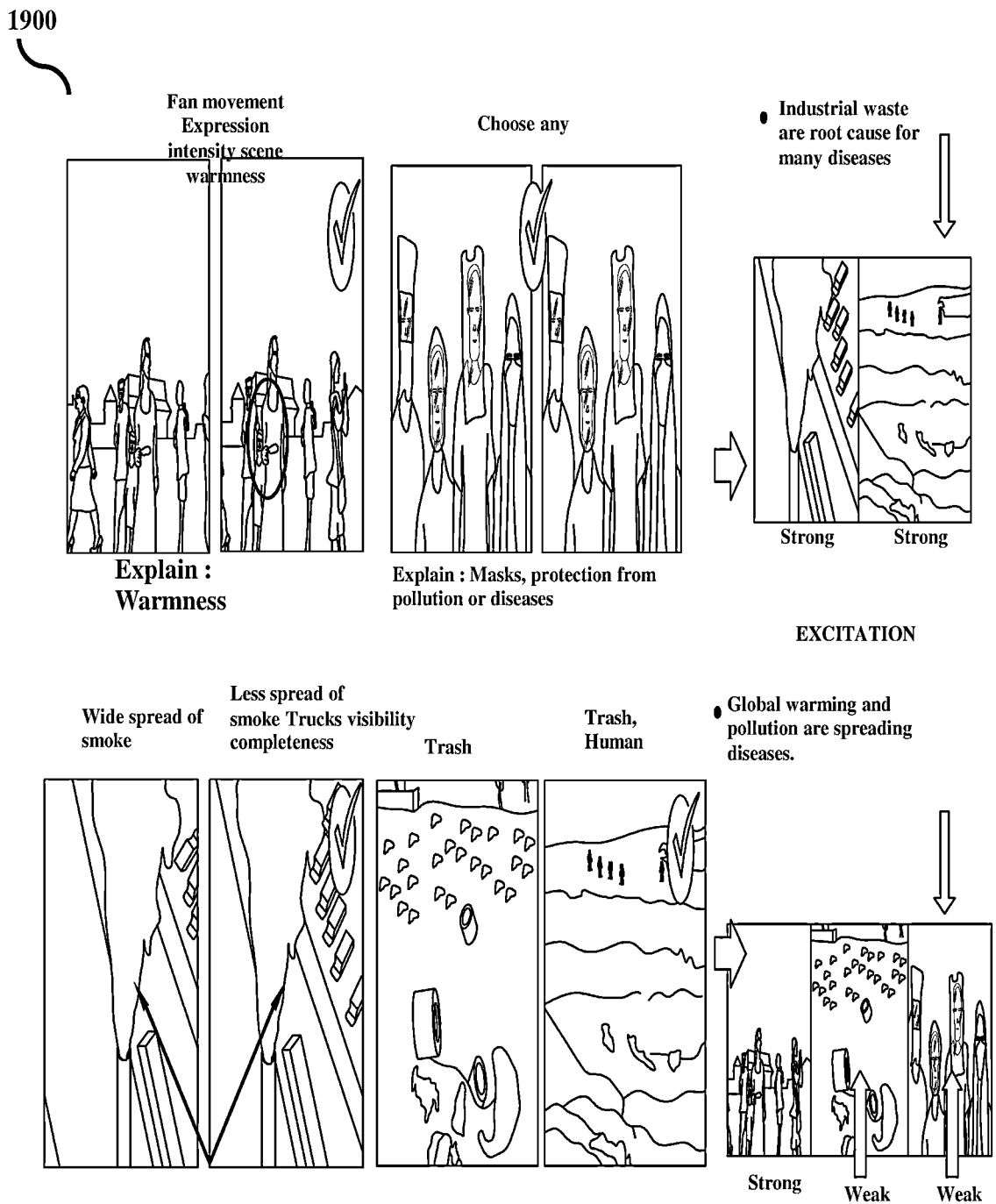
FIG. 19 is a view illustrating relative frame excitation according to an embodiment.

FIG. 19 is a view 1900 illustrating relative frame excitation according to an embodiment. In FIG. 19, four frames, such as warmness, masks, protection from pollution or diseases, and industrial pollution, are illustrated. Here, the strong similarity may be that industrial waste is the root cause of many diseases, and the weak similarity may be that global warming and pollution spread diseases.

Figure 20:
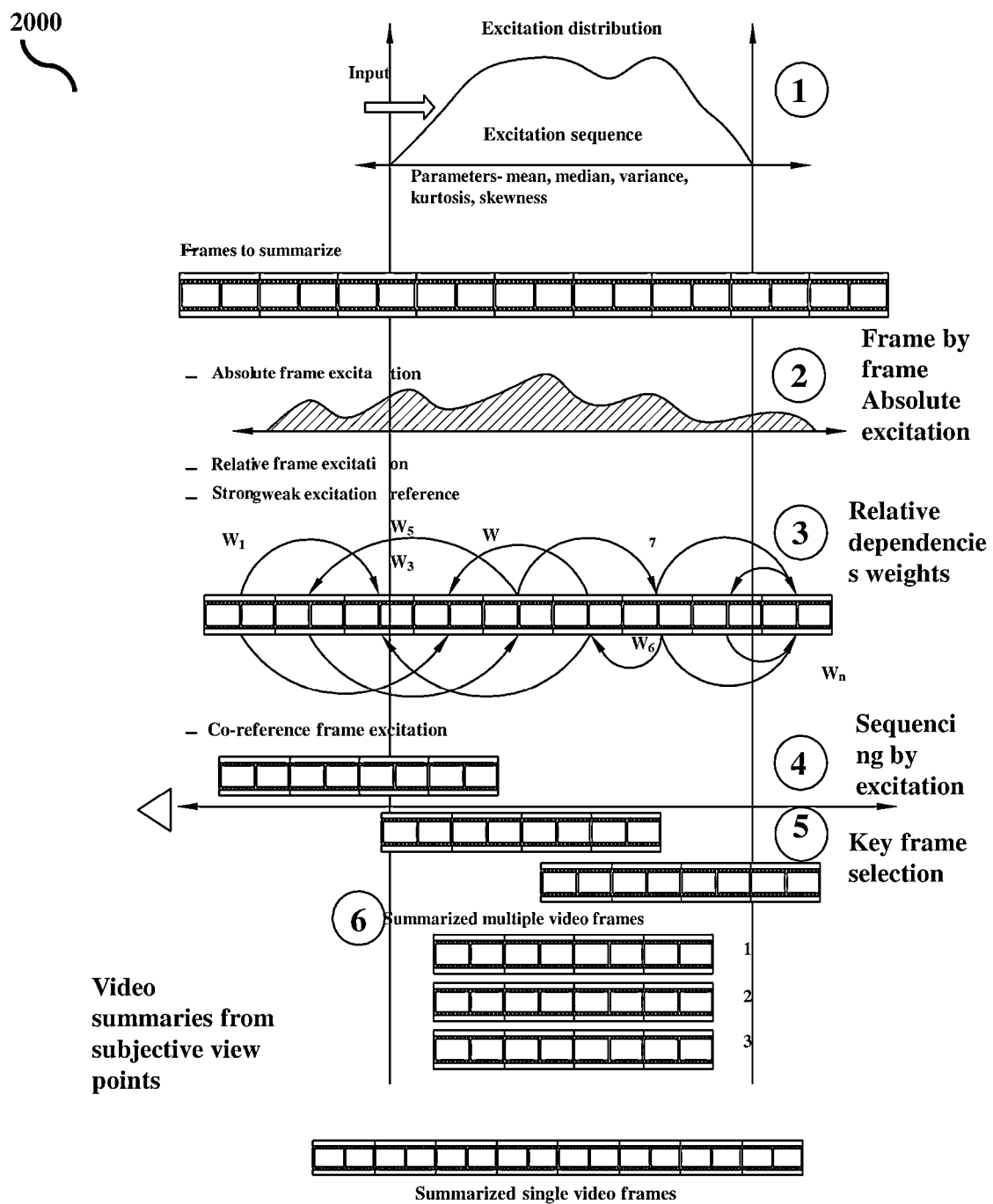
FIG. 20 is a view illustrating a method of summarizing video frames based on relative frame excitation according to an embodiment.

FIG. 20 is a view 2000 illustrating summarizing single video frames based on relative frame excitation according to an embodiment. The electronic device 100 may receive excitation distribution parameters. The excitation distribution parameters may include, for example, mean, median, variance, kurtosis, and skewness, but are not limited thereto. The electronic device 100 may summarize frames based on the excitation distribution parameters. At step (1), a video frame is input. At step (2), the electronic device 100 may determine absolute frame excitation. At step 3, the electronic device 100 may determine relative frame excitation and strong/weak excitation criteria based on the absolute frame excitation. At step 4, the electronic device 100 may determine co-referencing frame excitation based on the determined relative frame excitation and strong/weak excitation criteria. At step 5, the key frames may be selected according to the co-referencing frame excitation. At step 6, the electronic device 100 may provide summarized multiple video frames based on the co-referencing frame excitation, or may provide summarized a single video frame based on the summarized multiple video frames.

Figure 21:
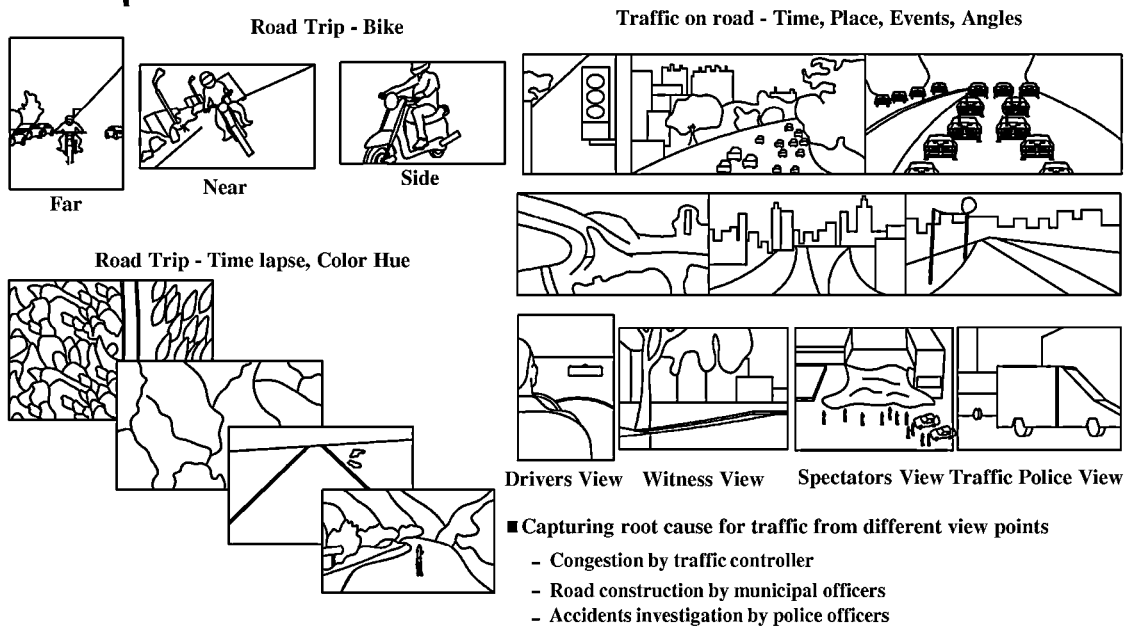
FIG. 21 is a view illustrating an example in which an electronic device captures viewpoints of multiple subjects according to an embodiment.

FIG. 21 is a view 2100 illustrating a case in which the electronic device 100 captures viewpoints of multiple subjects according to an embodiment. In FIG. 21, custom properties may be defined as viewpoints. The video summary may be produced based on a view point of a driver. The video summary may be produced based on a view point of a witness. The video summary may be produced based on a view point of a spectators. The video summary may be produced based on a view point of traffic police.

Figure 22:
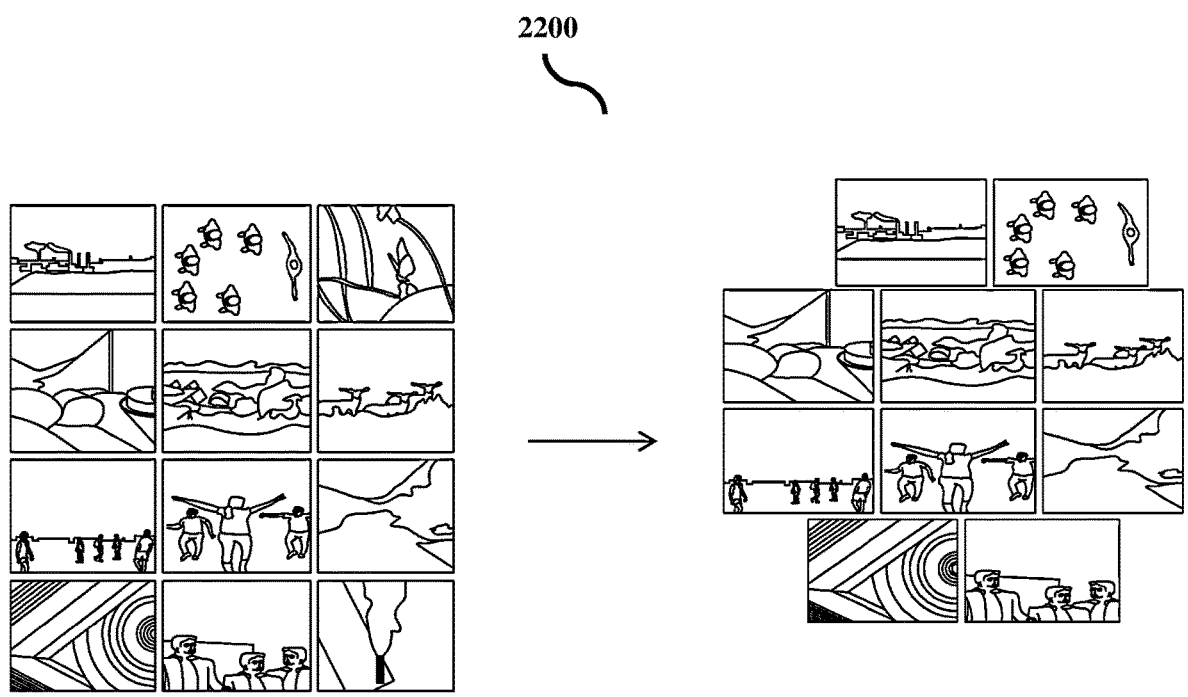
FIG. 22 is a view illustrating an example in which an electronic device captures narrative viewpoints according to an embodiment.

FIG. 22 is a view 2200 illustrating a case in which the electronic device 100 captures narrative viewpoints according to an embodiment. The user of the electronic device 100 may provide a narrative input of "the root cause of global warming is industrial expansion." Based on the narrative input, the electronic device 100 may produce a video summary associated with "the root cause of global warming is industrial expansion" from a source video. Here, for example, the narrative input may be received by one or more microphones of the electronic device 100 from a user.

Figure 23:
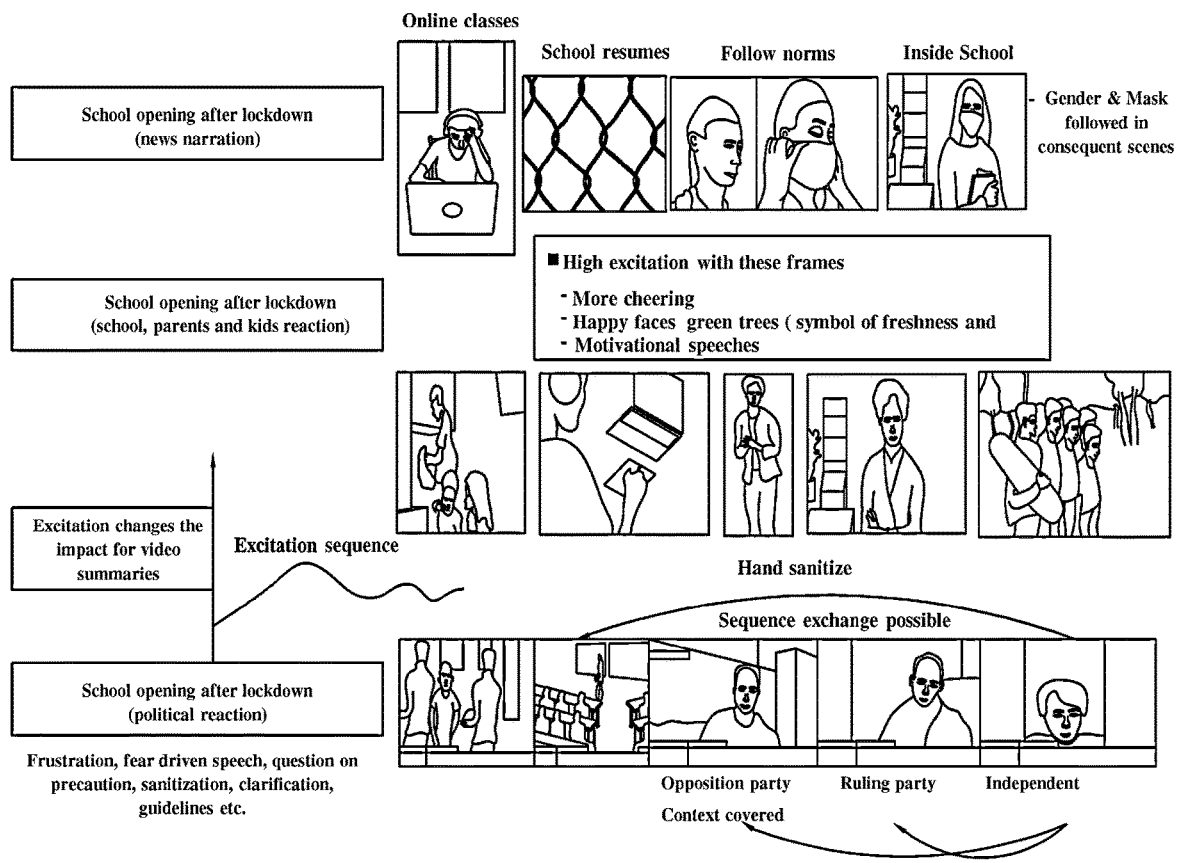
FIG. 23 is a view illustrating an example in which an electronic device captures highlights from viewpoints, according to an embodiment.

FIG. 23 is a view 2300 illustrating a case in which the electronic device 100 captures highlights from viewpoints, according to an embodiment. For example, the electronic device 100 may produce a video summary corresponding to a school reopening after lockdown. The video summary may include many frames that represent student reactions, safety measures, political involvement, and parent reactions.

Figure 24:
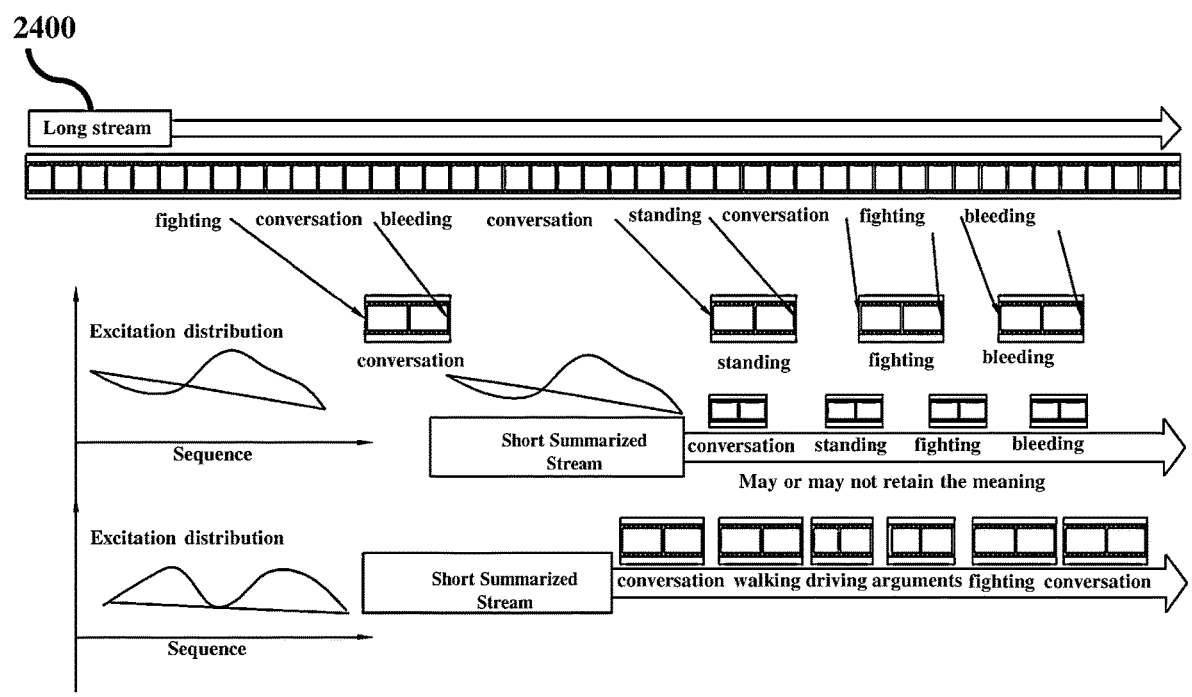
FIG. 24 is a view illustrating an example in which an electronic device captures progressive excitation according to an embodiment.

FIG. 24 is a view 2400 illustrating a case in which the electronic device 100 captures progressive excitation according to an embodiment. A video summary may include multiple frames associated with conversation, walking, arguments, fighting, and driving. The multiple frames may be arranged based on the progressive excitation.

Figure 25:
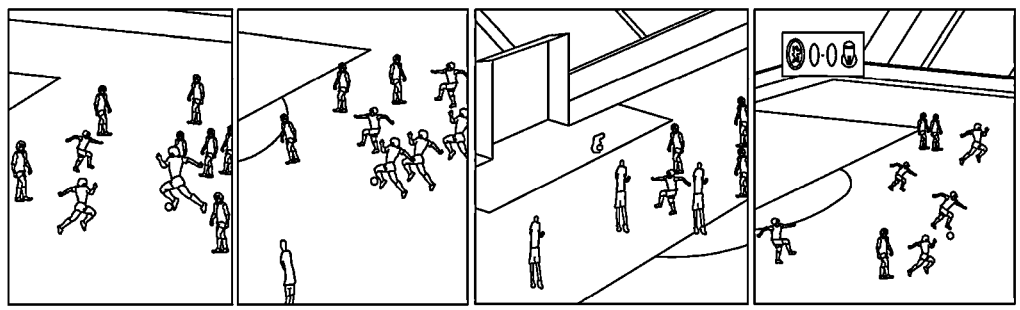
FIGS. 25 and 26 are views illustrating an example in which an electronic device produces a plurality of video summaries by obtaining a context of multiple viewpoints, according to an embodiment.
Figure 25:
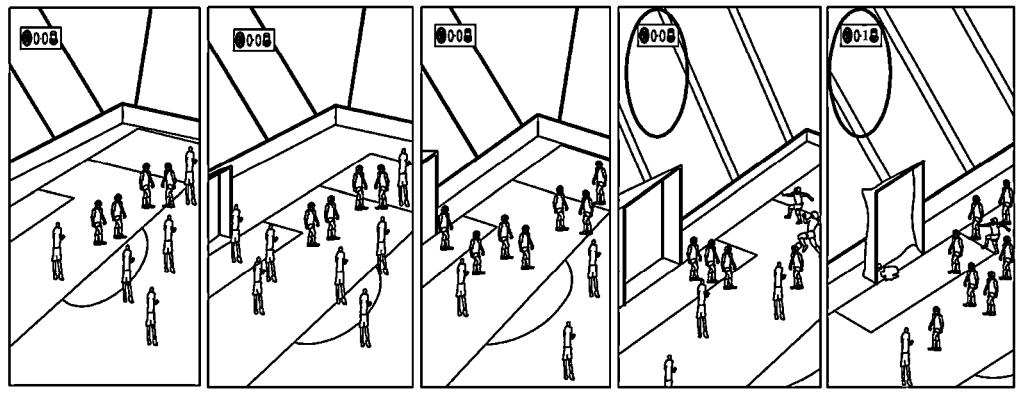
Figure 25:
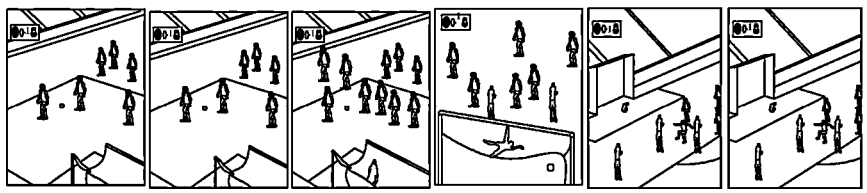
Figure 25:
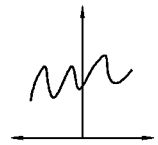
Figure 26:
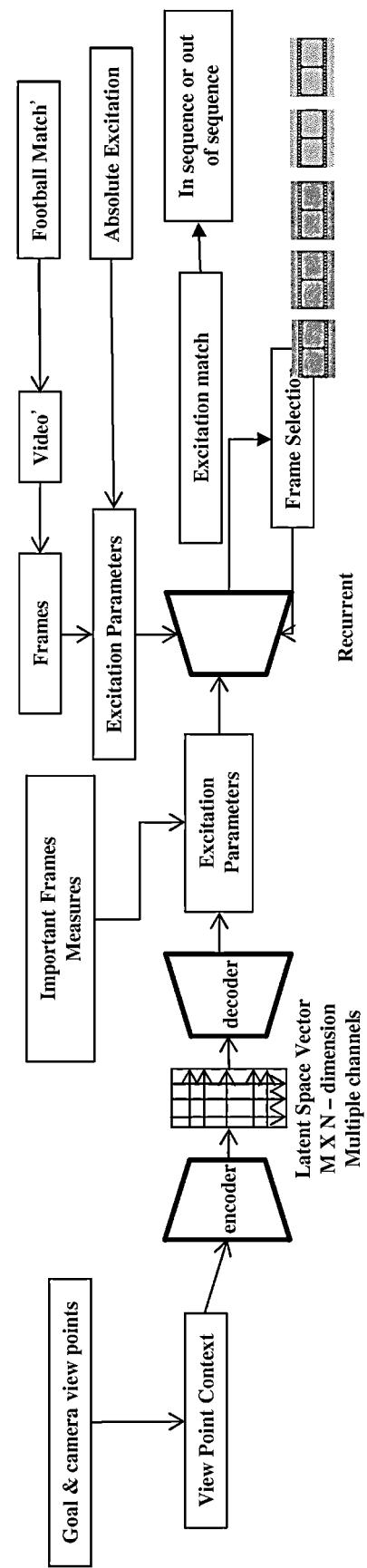

FIGS. 25 and 26 are views illustrating a case in which the electronic device 100 produces a plurality of video summaries by obtaining a context of multiple viewpoints, according to an embodiment.

Based on video frames, excitation of the video frames may be calculated using the four best parameters. The parameters may include speed, intensity, frequency, and duration. A weight may be adjusted (a) to modify the excitation parameters to adjust a request threshold according to the context, or (b) to obtain completeness in qualitative information of the frame. This may assist in pre- or post-adjustment for the frame according to selection criteria, context matching, or threshold values.

Relative evaluation for provided context (text or audio): when the excitation parameter is evaluated for a video frame, audio and text parameters may be similarly mapped in a latent space with the video frame. This will help to understand the relative context of the generalization. Frame selection based on the context may be further derived.

In addition, the electronic device 100 may change a color of the frame, a background of the frame, a foreground of the frame to reach or meet an expected excitation level, and may remove an object from the frame and replace the object in the frame.

Figure 27:
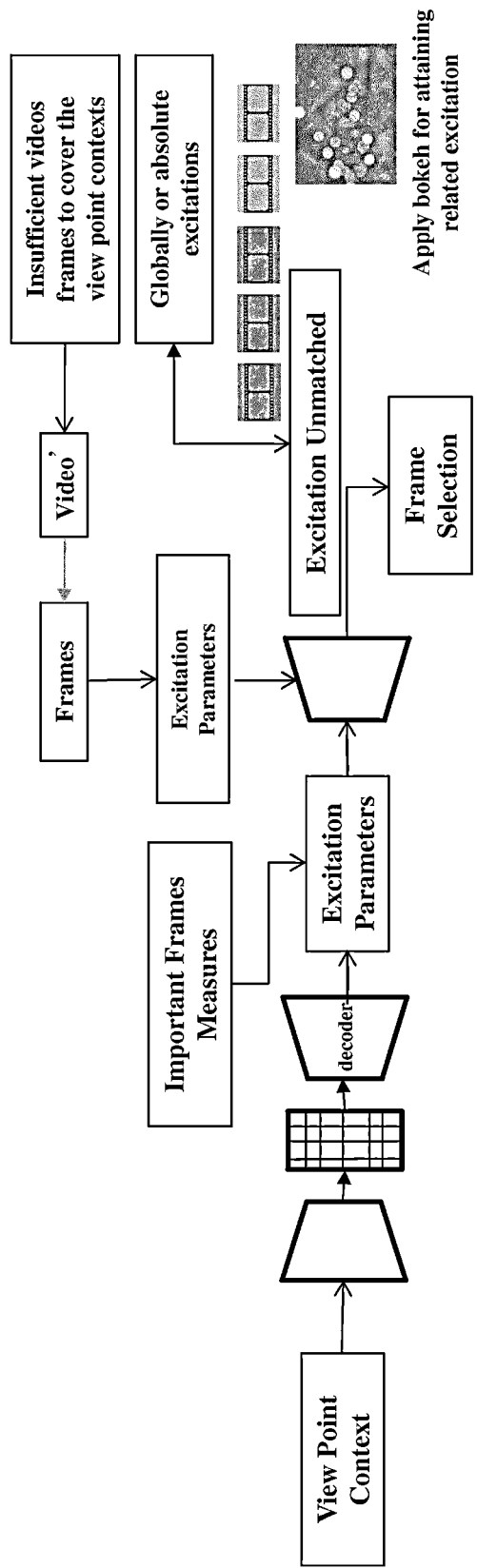
FIG. 27 is a diagram illustrating an example in which an electronic device produces a plurality of video summaries by obtaining a context of multiple viewpoints using a Bokeh effect, according to an embodiment.
Figure 28:
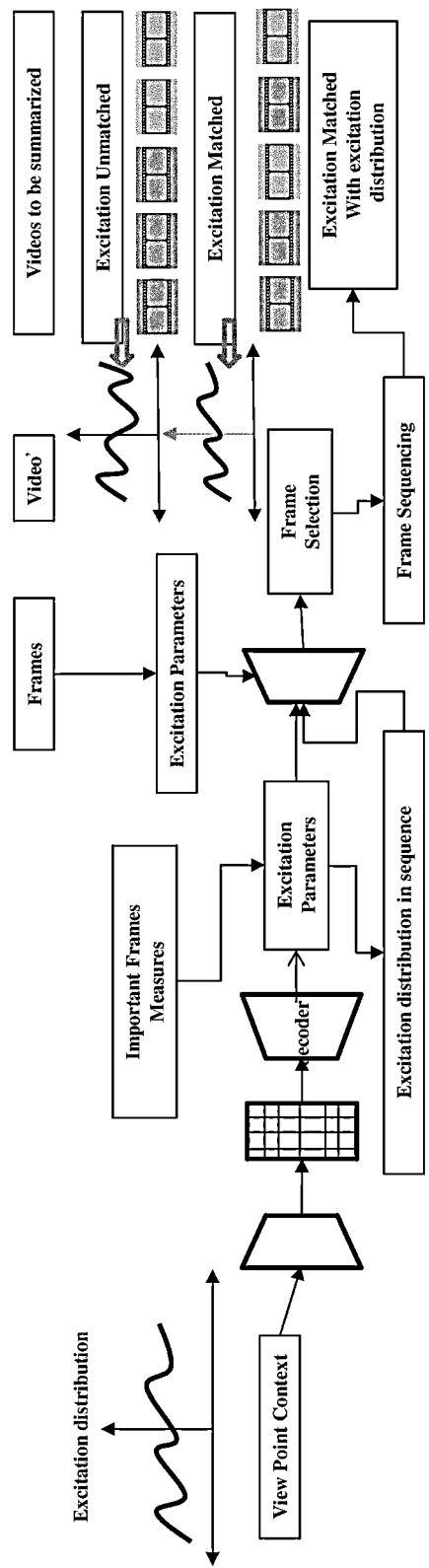
FIG. 28 is a diagram illustrating an example in which an electronic device produces a plurality of video summaries by obtaining a context of multiple viewpoints sequentially using an excitation distribution, according to an embodiment.

FIG. 27 is a view 2700 illustrating a case in which the electronic device 100 produces a plurality of video summaries by obtaining a context of multiple viewpoints using a Bokeh effect, according to an embodiment. FIG. 28 is a view 2800 illustrating a case in which the electronic device 100 produces a plurality of video summaries by obtaining a context of multiple viewpoints using excitation distribution in sequence, according to an embodiment.

In addition to the various examples discussed above, the excitation parameters of the weight criteria may be adjusted for the selected frames by generating effects of compensating view point thresholds. Further completeness of the frames is balanced through dynamic weight adjustment. In addition, there are visual adjustments such as blur, Bokeh, boomerang, slow motion, background change, clothing color change, clothing replacement, segmentation or other image processing techniques, augmented reality (AR) filter applications, and the like. Sound may be adjusted, such as volume, conversation repetition in frames, addition of music effects, and the like. A video frame may be set, using settings such as zoom in/out, camera angles, depth, shutter, ISO, aperture controls, and the like.

The embodiments disclosed herein may be implemented using network management functions running on at least one hardware device.

The foregoing description of the specific embodiments explains the general nature of the embodiments herein so that others can, by applying current knowledge, readily modify and/or adapt for various applications such as specific embodiments without departing from the inventive concept, and, therefore, such adaptations and modifications should and are intended to fall within the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the present disclosure.

What is claimed is:

1. A method of providing a video summary by an electronic device, the method comprising:
   receiving, by the electronic device, a video including a plurality of frames;
   determining, by the electronic device, at least one view point of a user viewing the video;
   determining, by the electronic device, at least one region of interest (ROI) of the user in at least one frame among the plurality of frames based on the at least one view point of the user;
   identifying, by the electronic device, a frame set from the plurality of frames including the at least one ROI based on determining the at least one ROI in the at least one frame;
   providing, by the electronic device, the video summary based on the identified frame set; and
   displaying the video summary on a display of the electronic device,
   wherein the identifying the frame set from the plurality of frames including the at least one ROI comprises:
      determining, by the electronic device, an absolute completeness score of the video; and
      determining, by the electronic device, absolute frame excitation information of the video based on the absolute completeness score,
   wherein the absolute frame excitation information comprises information for driving relative frame excitation associated with the frame set for sequencing the frame set, and
   wherein the determining the absolute frame excitation information of the video based on the absolute completeness score comprises:
      obtaining, by the electronic device, a speed of the ROI, an intensity of the ROI, an appearance frequency of the ROI, and a duration of playback, in each frame of the plurality of frames; and
      determining, by the electronic device, the absolute frame excitation information of the video based on the obtained speed of the ROI, the obtained intensity of the ROI, the obtained appearance frequency of the ROI, and the obtained duration of playback.

2. The method of claim 1, wherein the at least one view point comprises a subjective view point of the user, and wherein the method further comprises:
   obtaining, by the electronic device, a plurality of subjective parameters associated with the user, wherein the plurality of subjective parameters comprise at least one of an occupation of the user, an age of the user, a preference of the user, an event associated with the user, and an activity of the user on at least one social network site; and
   determining, by the electronic device, the subjective view point of the user based on the plurality of subjective parameters associated with the user.

3. The method of claim 1, wherein the at least one view point comprises an objective view point of the user, and wherein the method further comprises:
   obtaining, by the electronic device, a plurality of objective parameters associated with the user, wherein the plurality of objective parameters comprise at least one of a past history of the user, a present goal of the user, and an additional goal of the user; and determining, by the electronic device, the objective view point of the user based on the plurality of objective parameters associated with the user.

4. The method of claim 1, wherein the at least one view point comprises a physical view point of the user, and wherein the method further comprises:

obtaining, by the electronic device, a plurality of physical parameters associated with the user, wherein the plurality of physical parameters comprise at least one of an angle of a camera associated with the user, a location of the user, an ambient light condition around the user, a weather condition around the user, and a privacy preference of the user; and determining, by the electronic device, the physical view point of the user based on the plurality of physical parameters associated with the user.

5. The method of claim 1, wherein the identifying the frame set from the plurality of frames including the at least one ROI comprises:

determining, by the electronic device, an excitation level of each frame from the plurality of frames of the video based on a plurality of excitation parameters associated with each frame of the plurality of frames, wherein the plurality of excitation parameters comprise at least one of a the speed of the ROI, the intensity of the ROI, the appearance frequency of the ROI, and the duration of playback;

extracting, by the electronic device, at least one of an audio parameter and a text parameter from each frame of the plurality of frames;

determining, by the electronic device, a relative context of each frame from the plurality of frames of the video based on the excitation level and at least one of the audio parameter and the text parameter of each frame; and identifying, by the electronic device, the frame set from the plurality of frames including the at least one ROI based on the relative context of each frame.

6. The method of claim 1, wherein the providing the video summary based on the identified frame set comprises:

determining, by the electronic device, a weight for each frame of the plurality of frames from the identified frame set based on the at least one ROI and the at least one view point of the user;

sequencing, by the electronic device, each frame from the identified frame set based on the determined weight for each frame; and producing, by the electronic device, the video summary by merging the sequenced frame set.

7. The method of claim 6, wherein the determining the weight for each frame from the identified frame set based on the at least one ROI and the at least one view point of the user comprises:

obtaining, by the electronic device, a relation parameter between the at least one view point of the user and each frame from the identified frame set and a perspective angle of each frame from the identified frame set, wherein the relation parameter comprises at least one of an angle of the video based on the at least one view point of the user and a perspective view of a scene in the identified frame; and determining, by the electronic device, the weight for the identified frame based on the obtained relation parameter.

8. The method of claim 1, wherein the identifying the frame set from the plurality of frames including the at least one ROI further comprises:

detecting, by the electronic device, co-reference information of the video based on the absolute frame excitation information;

determining, by the electronic device, a sequence excitation level of the video based on the co-reference information; and mapping similarities among frames of the frame set based on the sequence excitation level.

9. The method of claim 8, wherein the co-reference information comprises information for maintaining the sequence excitation level associated with the frame set, and wherein the determining the co-reference information comprises:

obtaining at least one scene including audio associated with the frame set and semantic similarities associated with the frame set; and determining the co-reference information based on the at least one scene including the audio associated with the frame set and the semantic similarities associated with the frame set.

10. An electronic device for providing a video summary, comprising:

a display; and a controller connected to the display and configured to:

receive a video including a plurality of frames;

determine at least one view point of a user viewing the video;

determine at least one region of interest (ROI) of the user in at least one frame among the plurality of frames based on the at least one view point of the user;

identify a frame set from the plurality of frames including the at least one ROI based on determining the at least one ROI in the at least one frame;

provide the video summary based on the identified frame set; and display the video summary on the display, wherein the controller is further configured to:

determine an absolute completeness score of the video; and determine absolute frame excitation information of the video based on the absolute completeness score by obtaining a speed of the ROI, an intensity of the ROI, an appearance frequency of the ROI, and a duration of playback, in each frame of the plurality of frames, and wherein the absolute frame excitation information comprises information for driving relative frame excitation associated with the frame set for sequencing the frame set.

11. The electronic device of claim 10, wherein the at least one view point comprises a subjective view point of the user, and wherein the controller is further configured to:

obtain a plurality of subjective parameters associated with the user, wherein the plurality of subjective parameters comprise at least one of an occupation of the user, an age of the user, a preference of the user, an event associated with the user, and an activity of the user on at least one social network site; and determine the subjective view point of the user based on the plurality of subjective parameters associated with the user.

12. The electronic device of claim 10, wherein the at least one view point comprises an objective view point of the user, and
wherein the controller is further configured to:
obtain a plurality of objective parameters associated with the user, wherein the plurality of objective parameters comprise at least one of a past history of the user, a present goal of the user, and an additional goal of the user; and
determine the objective view point of the user based on the plurality of objective parameters associated with the user.

13. The electronic device of claim 10, wherein the at least one view point comprises a physical view point of the user, and
wherein the controller is further configured to:
obtain a plurality of physical parameters associated with the user, wherein the plurality of physical parameters comprise at least one of an angle of a camera associated with the user, a location of the user, an ambient light condition around the user, a weather condition around the user, and a privacy preference of the user; and
determine the physical view point of the user based on the plurality of physical parameters associated with the user.

14. The electronic device of claim 10, wherein the controller is further configured to:
determine an excitation level of each frame from the plurality of frames of the video based on a plurality of excitation parameters associated with each of the frames, wherein the plurality of excitation parameters comprise at least one of the speed of the ROI, the intensity of the ROI, the appearance frequency of the ROI, and the duration of playback;
extract at least one of an audio parameter and a text parameter from each frame of the plurality of frames;
determine a relative context of each frame from the plurality of frames based on the excitation level and at least one of the audio parameter and the text parameter of each frame; and
identify the frame set from the plurality of frames including the at least one ROI based on the relative context of each frame.

15. The electronic device of claim 10, wherein the controller is further configured to:
determine a weight for each frame of the plurality of frames from the identified frame set based on the at least one ROI and the at least one view point of the user;
sequence each frame from the identified frame set based on the determined weight for each frame; and
produce the video summary by merging the sequenced frame set.

16. The electronic device of claim 15, wherein the controller is further configured to:
obtain a relation parameter between the at least one view point of the user and each frame from the identified frame set and a perspective angle of each frame from the identified frame set, wherein the relation parameter comprises at least one of an angle of the video based on the at least one view point of the user and a perspective view of a scene in the identified frame; and
determine the weight for the identified frame based on the obtained relation parameter.

17. The electronic device of claim 10, wherein the controller is further configured to:
detect co-reference information of the video based on the absolute frame excitation information;
determine a sequence excitation level of the video based on the co-reference information; and
map similarities among frames of the frame set based on the sequence excitation level.

18. The electronic device of claim 17, wherein the controller is further configured to:
maintain the sequence excitation level associated with the frame set based on the co-reference information;
obtain at least one scene including an audio associated with the frame set and semantic similarities associated with the frame set; and
determine the co-reference information based on the at least one scene including the audio associated with the frame set and the semantic similarities associated with the frame set.

* * * * *